United States Patent
Frucht

[19]

[11] Patent Number: 6,139,160

[45] Date of Patent: *Oct. 31, 2000

[54] STRUCTURE FOR GENERATING A VIRTUAL POLYHEDRAL SPACE

[76] Inventor: Sara L. Frucht, 2304 Carleton St., Berkeley, Calif. 94704

[*] Notice: This patent is subject to a terminal disclaimer.

[21] Appl. No.: 09/234,628

[22] Filed: Jan. 21, 1999

Related U.S. Application Data

[63] Continuation-in-part of application No. 09/012,308, Jan. 23, 1998.

[51] Int. Cl.[7] .............................. G02B 5/08; A63G 31/00; F21V 7/00

[52] U.S. Cl. ........................ 359/850; 359/857; 359/861; 359/599; 359/616; 472/61; 472/63; 472/74; 362/301

[58] Field of Search ..................................... 359/839, 850, 359/855, 856, 857, 861, 871, 896, 616, 617, 599; 362/301; 40/427; 472/61, 63, 71, 74, 136

[56] References Cited

U.S. PATENT DOCUMENTS

| | | |
|---|---|---|
| 533,167 | 1/1895 | Fuller . |
| 2,430,318 | 11/1947 | Zimmerman ................................ 88/15 |
| 3,642,342 | 2/1972 | De Larrain . |
| 3,759,607 | 9/1973 | Boyle ..................................... 359/856 |
| 3,930,711 | 1/1976 | Powell . |
| 3,937,948 | 2/1976 | Allison .................................... 240/78 |
| 4,259,808 | 4/1981 | Oakes .................................... 359/617 |
| 4,277,139 | 7/1981 | Cox . |
| 4,475,126 | 10/1984 | Akins . |
| 4,768,701 | 9/1988 | Gabbard ................................... 229/8 |
| 4,776,653 | 10/1988 | Kaplan . |
| 4,793,671 | 12/1988 | Palochak et al. . |
| 4,948,241 | 8/1990 | Setteducati .............................. 350/618 |
| 4,952,004 | 8/1990 | Baird et al. .............................. 350/4.1 |
| 5,227,922 | 7/1993 | Boos ....................................... 359/857 |
| 5,241,418 | 8/1993 | Doak ....................................... 359/616 |
| 5,297,012 | 3/1994 | Fletcher .................................. 362/301 |
| 5,475,532 | 12/1995 | Sandoval et al. ....................... 359/616 |
| 5,855,520 | 1/1999 | Gitter et al. . |

OTHER PUBLICATIONS

Regular Polytopes; H.S.M. Coxeter; Ch. 5, pp. 75–84; Dover Publications, Inc. (1973).

Polyhedron Models; Magnus J. Wenninger; pp. 4–7; Cambridge Univ. Press (1971).

*Primary Examiner*—Ricky D. Shafer
*Attorney, Agent, or Firm*—Henneman & Saunders; Larry E. Henneman, Jr.

[57] ABSTRACT

A structure capable of generating a virtual polyhedral space includes a plurality of walls, each having a first side edge, a second side edge, and a reflective surface. The walls are disposed adjacent one another, with the first side edge of each wall adjacent the second side edge of an adjacent wall, each wall lying in an associated one of a plurality of planes intersecting at a common apex, thus forming a pyramid shaped structure. So disposed, the walls define an interior space of the structure, with the reflective surfaces of the walls facing the interior space. Each wall further includes a base edge. Together, the base edges of the reflective walls define a base opening of the structure, which provides access to the interior space. The images of optional base coverings form coherent images of a virtual polyhedron in the reflective surfaces of the walls. Three-sided, four-sided, and five-sided embodiments are described. Linear and angular measurements of the walls and floors, necessary to create the coherent virtual images, are provided.

54 Claims, 16 Drawing Sheets

| virtual faces | {3,3,3} | {6,6,3} | {6,4,6} | {4,4,4} | {4,8,4} | {8,6,4} | {8,3,8} | {6,10,4} | {6,5,6} | {5,5,5} | {10,3,10} |
|---|---|---|---|---|---|---|---|---|---|---|---|
|  | 4 | 12 | 24 | 8 | 16 | 48 | 24 | 120 | 60 | 20 | 60 |
| ∠aOb | 109.46 | 109.46 | 54.73 | 90 | 90 | 54.73 | 54.73 | 37.38 | 37.38 | 63.44 | 37.38 |
| ∠bOc | 109.46 | 70.54 | 54.73 | 90 | 90 | 35.27 | 54.73 | 31.72 | 37.38 | 63.44 | 37.38 |
| ∠cOa | 109.46 | 70.54 | 70.54 | 90 | 45 | 45 | 90 | 20.9 | 41.8 | 63.44 | 63.44 |
| $\overline{aO}$ | 1 | 1 | 1 | 1 | 1 | 1 | 1 | 1 | 1 | 1 | 1 |
| $\overline{bO}$ | 1 | 1 | 1 | 1 | 1 | 1 | 1 | 1 | 1 | 1 | 1 |
| $\overline{cO}$ | 1 | 1 | 1 | 1 | 1 | 1 | 1 | 1 | 1 | 1 | 1 |
| ∠abc | 60 | 45.01 | 77.86 | 60 | 31.39 | 55.71 | 100.58 | 34.39 | 41.77 | 60 | 110.29 |
| ∠bca | 60 | 89.97 | 51.07 | 60 | 74.31 | 83.41 | 39.71 | 87.28 | 69.11 | 60 | 34.86 |
| ∠cab | 60 | 45.01 | 51.07 | 60 | 74.31 | 40.88 | 39.71 | 58.38 | 69.11 | 60 | 34.86 |
| $\overline{ab}$ | 1.633 | 1.633 | 0.919 | 1.414 | 1.414 | 0.919 | 0.919 | 0.641 | 0.641 | 1.052 | 0.641 |
| $\overline{bc}$ | 1.633 | 1.155 | 0.919 | 1.414 | 1.414 | 0.606 | 0.919 | 0.547 | 0.641 | 1.052 | 0.641 |
| $\overline{ca}$ | 1.633 | 1.155 | 1.155 | 1.414 | 0.765 | 0.765 | 1.414 | 0.363 | 0.713 | 1.052 | 1.052 |

|  | {4,3,4,3} | {3,3,3,3} | {4,4,3,4} | {3,4,5,4} | {5,3,5,3} |
|---|---|---|---|---|---|
| virtual faces | 12 | 6 | 24 | 60 | 30 |
| ∠a0b | 54.73 | 70.54 | 45 | 20.90 | 37.38 |
| ∠b0c | 54.73 | 70.54 | 35.27 | 31.72 | 37.38 |
| ∠c0d | 54.73 | 70.54 | 35.27 | 31.72 | 37.38 |
| ∠d0a | 54.73 | 70.54 | 45 | 20.90 | 37.38 |
| $\overline{a0}$ | 1 | 1 | 1 | 1 | 1 |
| $\overline{b0}$ | 0.866 | 1 | 1.036 | 1.005 | 0.911 |
| $\overline{c0}$ | 1 | 1 | 1 | 1 | 1 |
| $\overline{d0}$ | 0.866 | 1 | 1.036 | 1.005 | 0.911 |
| ∠abc | 109.45 | 90 | 81.32 | 86.56 | 116.67 |
| ∠bcd | 70.55 | 90 | 114.07 | 69.1 | 63.33 |
| ∠cda | 109.45 | 90 | 81.32 | 86.56 | 116.67 |
| ∠dab | 70.55 | 90 | 83.20 | 117.78 | 63.33 |
| $\overline{ab}$ | 0.866 | 1.155 | 0.78 | 0.363 | 0.618 |
| $\overline{bc}$ | 0.866 | 1.155 | 0.617 | 0.548 | 0.618 |
| $\overline{cd}$ | 0.866 | 1.155 | 0.617 | 0.548 | 0.618 |
| $\overline{da}$ | 0.866 | 1.155 | 0.78 | 0.363 | 0.618 |

STRUCTURE FOR GENERATING A VIRTUAL POLYHEDRAL SPACE

RELATED APPLICATIONS

This application is a continuation-in-part of U.S. patent application Ser. No. 09/012,308, filed on Jan. 23, 1998, which is incorporated herein by reference in its entirety.

BACKGROUND OF THE INVENTION

1. Field of the Invention

This invention relates generally to architectural structures, and more particularly to an architectural structure capable of generating a virtual polyhedral space.

2. Description of the Background Art

It is well known that placing mirrors on walls of an architectural structure creates the image of a larger space. For example, a large mirror on a wall creates the image of an opening into a virtual room. The virtual room is the image of the real room in the mirror.

Such use of mirrors has, for the most part, been limited to placement upon the walls or ceilings of conventional architectural structures. As a result, the mirrors are incapable of generating a coherent, bounded virtual space. In other words, even if mirrors are placed on all of the walls of a conventional structure, the individual images generated by the mirrors on the various walls do not join to form a single, bounded virtual space, but rather form an infinite lattice of disconnected images. Similarly, objects placed within the real room, do not form coherent symmetric sets of virtual images within the virtual space.

What is needed, therefore, is an architectural structure capable of generating a coherent, bounded image of a three-dimensional space. What is also needed is an architectural structure capable of generating a coherent, symmetric set of images from an object placed within the architectural structure.

SUMMARY

A novel architectural structure capable of generating a virtual image of a polyhedral space is disclosed. The structure includes a plurality of walls, each having a first side edge, a second side edge, and a reflective surface. The walls are disposed adjacent one another, with the first side edge of each wall adjacent the second side edge of an adjacent wall, with each wall lying in an associated one of a plurality of planes intersecting at a common apex, thus forming a pyramid shaped structure. So disposed, the walls define an interior space of the architectural structure, with the reflective surfaces of the walls facing the interior space.

Each wall further includes a base edge. Together, the base edges of the reflective walls form a support base for supporting the architectural structure on a floor surface. In one embodiment the floor surface is opaque. The images of the floor surface in the reflective surfaces of the walls form a virtual image of a coherent, bounded polyhedron. In an alternate embodiment, the floor has a reflective surface, generating an image of an infinite lattice of subdivided cubes or octahedra in the reflective surfaces of the walls. Linear and angular measurements of the walls and floors of various embodiments, necessary to create the coherent virtual images, are provided. Angular measurements are approximated to the nearest one-hundredth of a degree, and linear measurements are approximated to the nearest one-thousandth of a unit.

In one embodiment, the architectural structure has three walls. In another embodiment, the architectural structure has four walls. In yet another embodiment, the architectural structure has five walls. In each of the three-walled, four-walled, and five walled structures, and optional opening in the floor or in one or more of the walls provides access to the interior of the architectural structure.

Optionally, at least one of the walls is truncated. In one embodiment, at least one of the walls is truncated across an angle formed between the base edge of the wall and the side edge of the wall. Optionally, the truncation defines an opening into the interior of the architectural structure. In another embodiment, at least one of the walls is truncated across an angle formed between the first side edge of the wall and the second side edge of the wall.

Optional ornamental structure groups disposed within the interior of the architectural structures also (generate coherent images in the reflective surfaces of the walls. Examples of ornamental structure groups include, but are not limited to, illumination devices, stripes, or other decorative elements. The ornamental structure groups are optionally disposed along the side edges of the walls, along the base edges of the walls, on the surfaces of the walls, on the floor, and/or suspended from the apex of the architectural structure. In a particular embodiment, one ornamental structure group is an elongated element (e.g., a painted stripe) disposed on the reflective surface of each of the walls, and extends from the first side edge of each wall to the second side edge of each wall, parallel to the base edge of the wall. In a truncated embodiment, an optional ornamental element is suspended from the center of an apex cap wall disposed within an opening created in the architectural structure by the truncation of the apex.

BRIEF DESCRIPTION OF THE DRAWINGS

The present invention is described with reference to the following drawings, wherein like reference numbers denote substantially similar elements:

FIG. 4 is a chart providing angles and lengths of wall edges of other three-walled architectural structures in accordance with the present invention;

FIG. 8 is a chart providing angles and lengths of wall edges of other four-walled architectural structures in accordance with the present invention;

DETAILED DESCRIPTION

The present invention overcomes the problems associated with the prior art, by using an architectural structure capable of generating an image of a coherent polyhedral space. Specifically, the present invention describes an architectural structure wherein the walls lie in associated planes which meet at a common apex positioned at the center of a virtual polyhedron. In the following description, numerous specific details are set forth (e.g., architectural structure heights and placement of ornamental structures) in order to provide a thorough understanding of the invention. Those skilled in the art will recognize, however, that the invention may be practiced apart from these specific details. In other instances, details of well known construction practices have been omitted, so as not to unnecessarily obscure the present invention.

Figure 1:
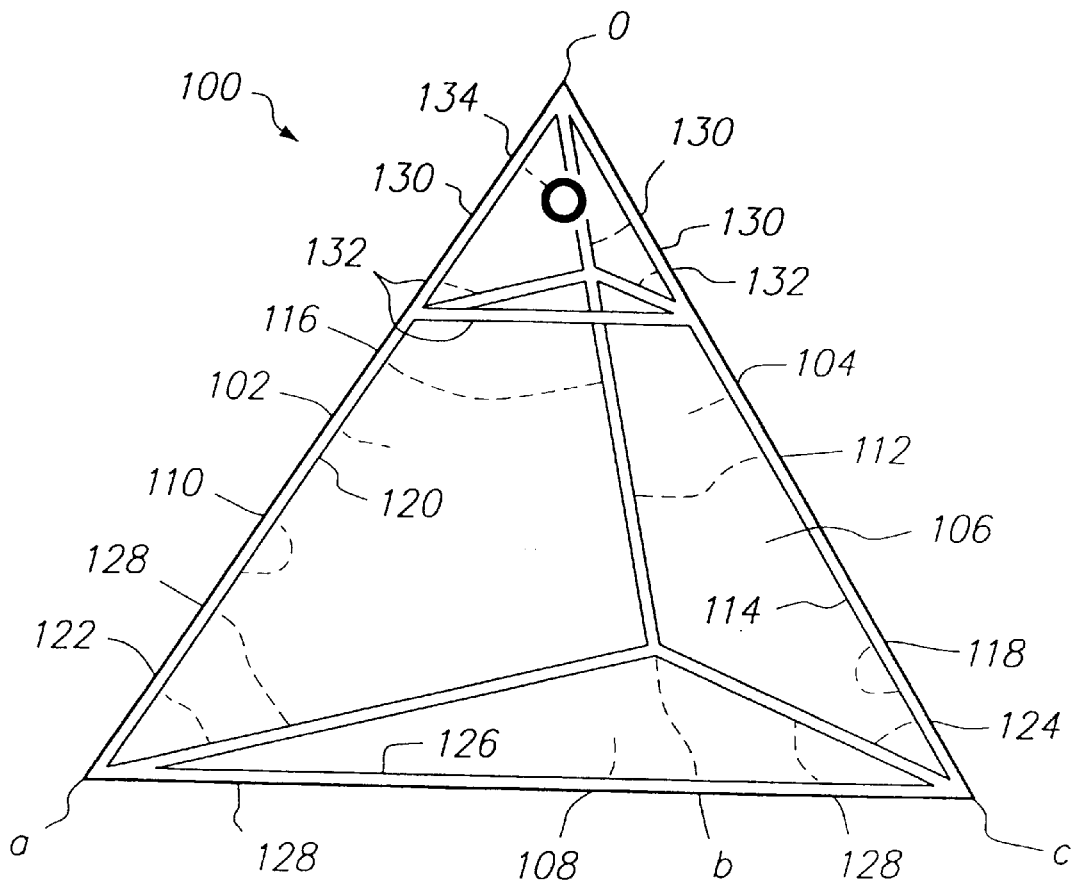
FIG. 1 is a perspective view of a three-walled architectural structure in accordance with the present invention.

FIG. 1 is a perspective view of a three-sided architectural structure 100, including a first wall 102, a second wall 104, and a third wall 106, all resting on a floor 108. Walls 102, 104 and 106 are triangular shaped, each having a first side edge 110, 112, and 114, a second side edge 116, 118, and 120, and a base edge 122, 124, and 126, respectively. Walls 102, 104, and 106 are disposed adjacent one another to form structure 100 as a pyramid, base edges 122, 124, and 126 forming a support base for supporting structure 100 on floor 108. In particular, first side edge 110 of first wall 102 is disposed adjacent second side edge 120 of third wall 106, second side edge 116 of first wall 102 is disposed adjacent first side edge 112 of second wall 104, and second side edge 118 of second wall 104 is disposed adjacent first side edge 114 of third wall 106. It is not necessary for the side edges of walls 102, 104, and 106 to actually abut one another, as long as each of walls 102, 104, and 106 lies in an associated plane passing through two of three base vertices (a, b, c) and an apex (O) of structure 100. For example, first wall 102 lies in an associated plane passing through base vertices (a) and (b) and apex (O).

Walls 102, 104 and 106 each have a reflective surface facing the interior of architectural structure 100. In one embodiment, walls 102, 104 and 106 are constructed from conventional materials (e.g. dry wall) and are covered with a reflective coating. Alternatively, the interior surfaces of walls 102, 104 and 106 may be formed from glass mirrors. In yet another embodiment suitable for a child's play structure, walls 102, 104 and 106 are formed from cardboard, plastic, or the like, and are provided with a reflective coating, for example metal foil.

Architectural structure 100 further includes a number of ornamental structure groups including base edge group 128, side edge group 130, wall stripe group 132, and a suspended ornament 134. In this particular embodiment, base edge group 128 includes lighting strips disposed in the angles formed between floor 108 and walls 102, 104, and 106. Side edge group 130 includes lighting strips disposed in the angles formed between first wall 102 and second wall 104, between second wall 104 and third wall 106, and between third wall 106 and first wall 102. Wall stripe group 132 is disposed on the interior surfaces of walls 102, 104, and 106, and lies in a plane parallel to floor 108. Ornament 134 is simply a decorative object which is suspended from apex (O) of structure 100, by a wire or the like. Those skilled in the art will recognize that base edge group 128 and side edge group 130 need not be lighting strips, but may be any elongated element (e.g. a plastic or painted strip) disposed to highlight the edges of walls 102, 104, and 106, and the edges of floor 108. Similarly, wall stripe group may be any elongated elements, including lighting strips, disposed as described above.

Figure 2:
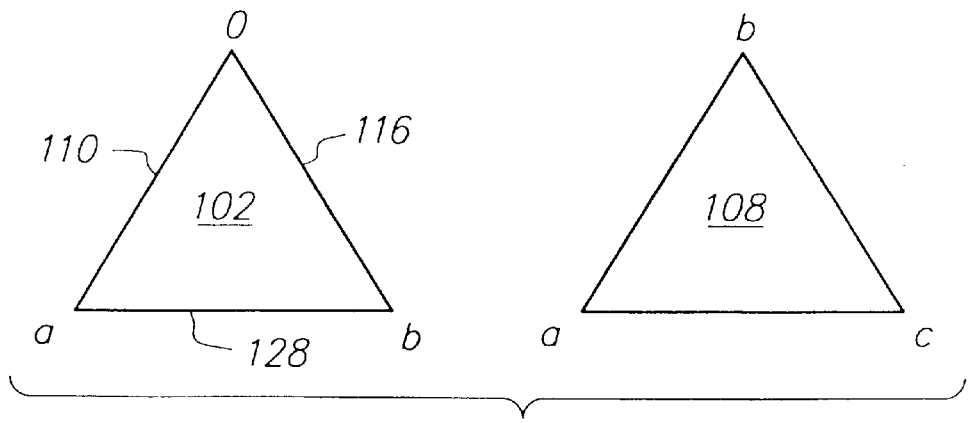
FIG. 2 is a plan view of one wall and a floor of the structure shown in FIG. 1.

FIG. 2 is a plan view of first wall 102 and floor 108. Walls 104 and 106 are identical to all 102, and are, therefore, not shown for the sake of clarity. In order for structure 100 to generate a coherent image of a polyhedron, certain size and angular relationships must be maintained between walls 102, 104, and 106, and floor 108. In this particular embodiment, first side 102 is constructed with an apex angle (aOb) of 63.44 degrees, first side edge 110 (aO) and second side edge 116 (bO) both 1 unit in length, and base edge 128 (ab) 1.052 units in length. Floor 108 is an equilateral triangle, wherein each of sides (ab), (bc), and (ca) is 1.052 units in length, and each angle is 60 degrees. Those skilled in the art will recognize that, given the relationships provided above, architectural structure 100 may be scaled to any desirable size, from a child's play house to a multi-story building.

Figure 3A:
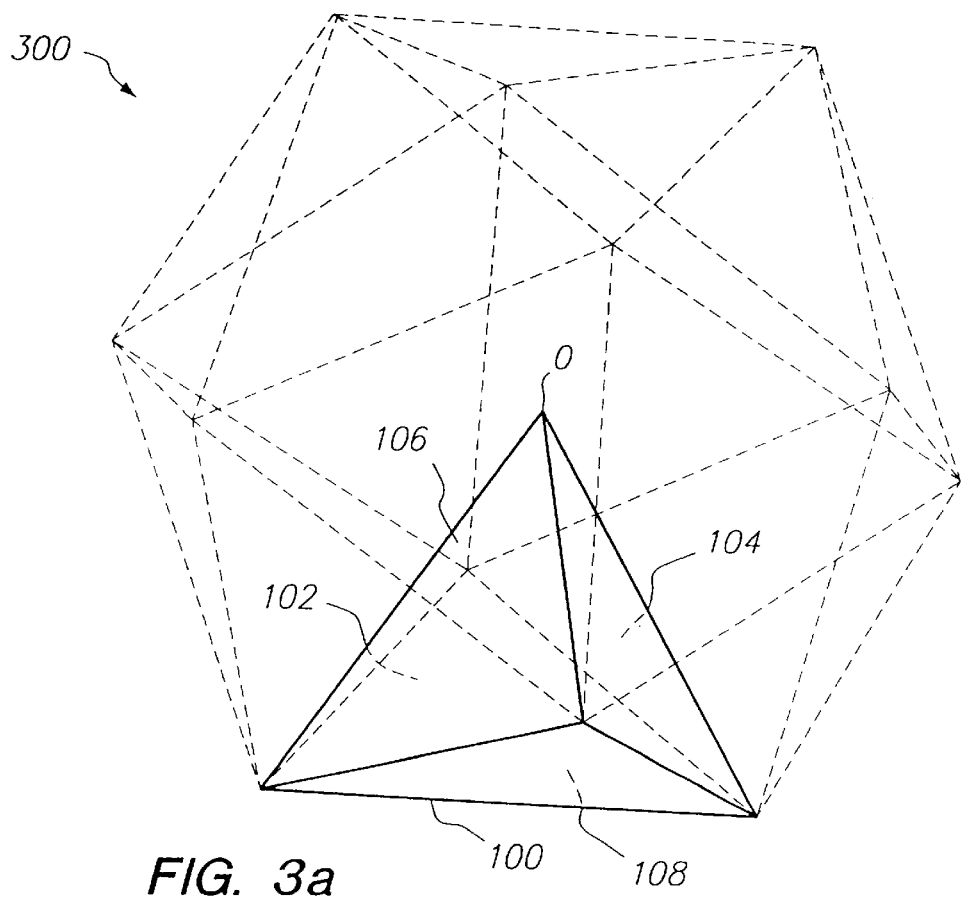
FIG. 3a is a perspective view of the virtual space generated by the structure of FIG. 1.

FIG. 3a is a perspective view of a virtual icosahedron (20 faces) 300 (dotted lines) generated by architectural structure 100 (solid lines), as it would appear to an observer from the interior of structure 100. In one embodiment, floor 108 is opaque. Each face of virtual icosahedron 300 is an image of floor 108 (cut up and reassembled) in the reflective surfaces of walls 102, 104, and 106. Structure 100 constitutes one cell of virtual icosahedron 300, with the apex (O) of structure 100 positioned at the center of virtual icosahedron 300. The remaining cells each consist of one face of virtual icosahedron 300 with side edges (not shown) extending from the vertices of the face to apex (O) of structure 100, at the center of virtual icosahedron 300.

Figure 3B:
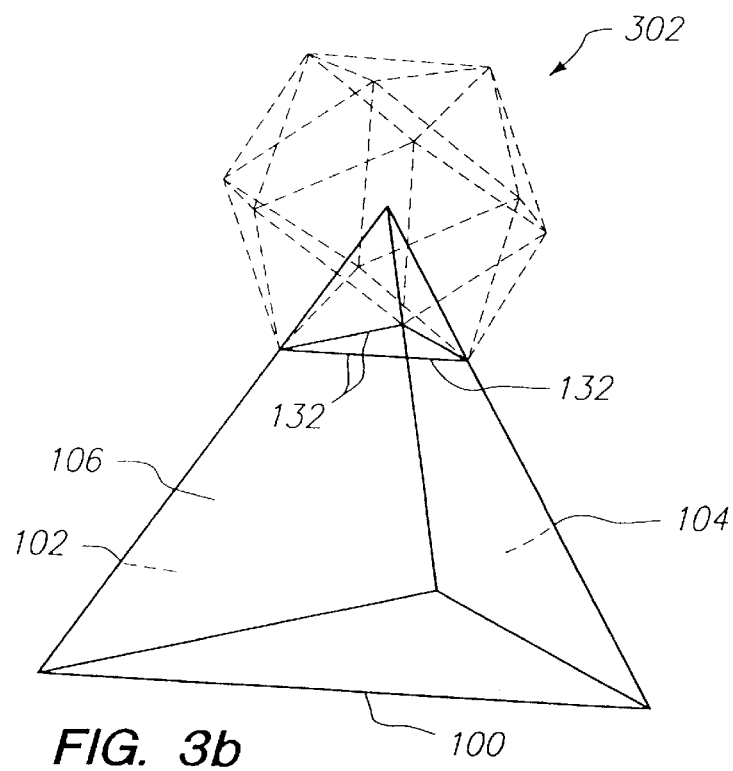
FIG. 3b is a perspective view of the virtual image generated by an ornamental structure disposed on the walls of the structure of FIG. 1.

FIG. 3b is a perspective view of a virtual icosahedron 302 generated from wall stripe group 132 by architectural structure 100. Each edge of virtual icosahedron 302 is an image of one or more sections of wall stripe group 132 in the reflective surfaces of walls 102, 104, and 106. To an observer inside architectural structure 100, virtual icosahedron 302 appears as a wire frame structure floating in air.

Figure 3C:
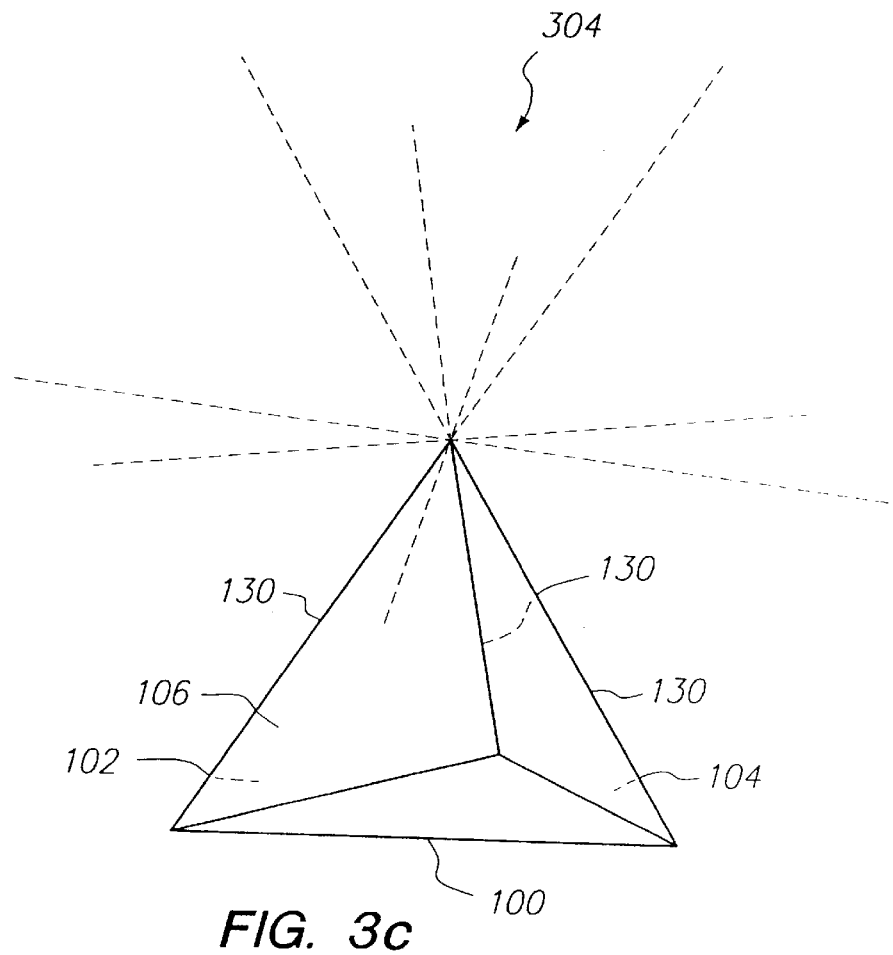
FIG. 3c is a perspective view of the virtual image generated by ornamental structures disposed along the edges of the walls of the structure of FIG. 1.

FIG. 3c is a perspective view of a plurality 304 of virtual lines generated from side edge group 130 by architectural structure 100. Each of virtual lines 304 is an image of one section of edge group 130 in the reflective surfaces of walls 102, 104, and 106. To an observer inside architectural structure 100, virtual lines 304 appear to extend from apex (O) of structure 100 to the vertices of virtual icosahedron 300 (not shown).

Figure 3D:
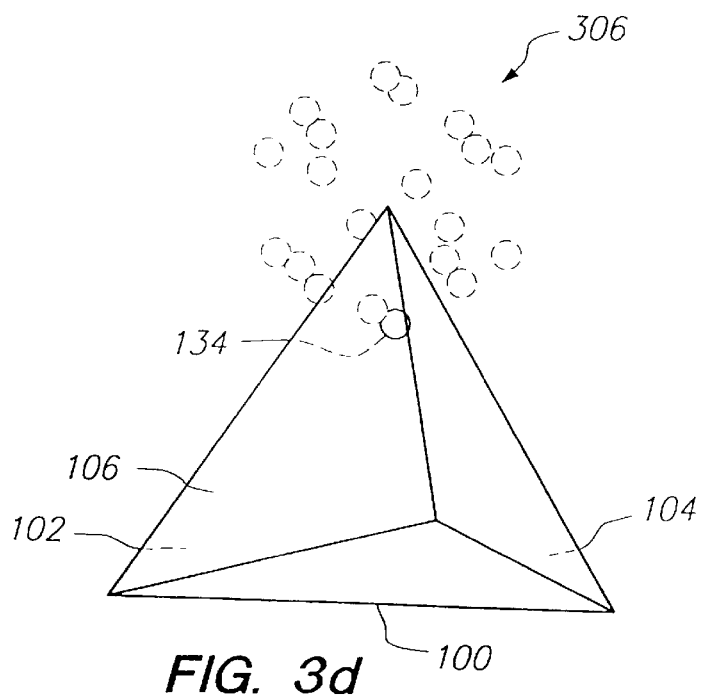
FIG. 3d is a perspective view of the virtual image generated by an ornamental structure suspended from the apex of the structure of FIG. 1.

FIG. 3d is a perspective view of a virtual nineteen-element structure 306 generated from ornament 134 by structure 100. Each element of nineteen-element structure 306 is an image of ornament 134 in the reflective surfaces of walls 102, 104, and 106. To an observer inside architectural structure 100, nineteen-element structure 306 and ornament 134 appear together as a twenty-element structure, with each element disposed a fixed distance from apex (O) along an associated axis (not shown) passing from apex (O) to the center of one of the faces of virtual icosahedron 300 (not shown).

In view of the relationships between the ornamental structure groups and their projected images described above, many possibilities exist for creating special effects within architectural structure 100. For example, spotlights or laser patterns illuminating floor 108 would also illuminate the faces of icosahedron 300, because the faces of icosahedron 300 are images of floor 108. Additional special effects can be created by using programmable linear light banks for base group 128 and side edge group 130. For example, strobing the lights of side edge group 130 from the apex (O) toward the base vertices (a, b, and c) of structure 100, would give the appearance of lights moving outward from apex (O), along virtual lines 304 (FIG. 3c). Other special effects will be apparent to those skilled in the art, particularly in light of the present disclosure.

FIG. 4 is a table 400, providing linear and angular measurements for constructing other three-sided architectural structures capable of generating coherent virtual polyhedra. Each of the structures listed in table 400 is identified by index notation of the form {a,b,c}, corresponding to the base vertices (see FIG. 2) of the described architectural structure. The index notation identifies the base structure (i.e., the described architectural structure) as well as the generated virtual polyhedron. From the point of view of the architectural structure, the solid angle between adjacent walls meeting at a base vertex (e.g., vertex (b)) can be determined by dividing 360° by the index number associated with vertex (b). From the point of view of the generated virtual polyhedron, each index number indicates the number of faces of the polyhedron meeting at the associated vertex. In any event, the indices listed at the tops of the columns of table 400 identify unique architectural structures and associated virtual polyhedra. The values listed below each set of indices provide the linear and angular (in degrees) measurements necessary to construct the associated architectural structure.

The indices are also useful in identifying symmetry relationships which must be maintained in order to generate coherent images of ornamental structure groups placed within the structures. In particular, symmetry must be maintained about plane bisectors of solid angles between adjacent walls meeting at odd ordered vertices (i.e., vertex index=1, 3, 5, . . . ). The symmetry is important because the virtual images are formed by the walls of the structure cutting up and reassembling the images of the real structures. If symmetry is not maintained, the cut up images cannot be reassembled into a coherent virtual image. There is no such symmetry requirement for even ordered vertices (i.e., vertex index=2, 4, 6, . . . ). For example, in a {6,5,6} structure, symmetry must be maintained about a plane bisector of the solid angle formed between the walls meeting at vertex (b), because vertex (b) has an odd ordered index (i.e., 5). There are no such symmetry requirements relating to the solid angles formed between the walls meeting at the other vertices, because the indices of the other vertices are even ordered (i.e., 6 and 6).

Table 400 also indicates that the distance from each vertex (a, b, and c) to the apex (O) is the same (i.e., aO=bO=cO=1). This is expected, because the apex (O) lies at the center of the virtual polyhedron, and the vertices lie on the surface. This is not a requirement, however, for a structure to project a coherent virtual polyhedron. For example, as long as the above described symmetry requirements are met, the structure formed by the walls may be tilted with respect to the floor. This tilting will distort the projected polyhedron, but not destroy its coherency. The angles between the walls at the apex (O) of the structure must, however, be maintained.

Figure 5:
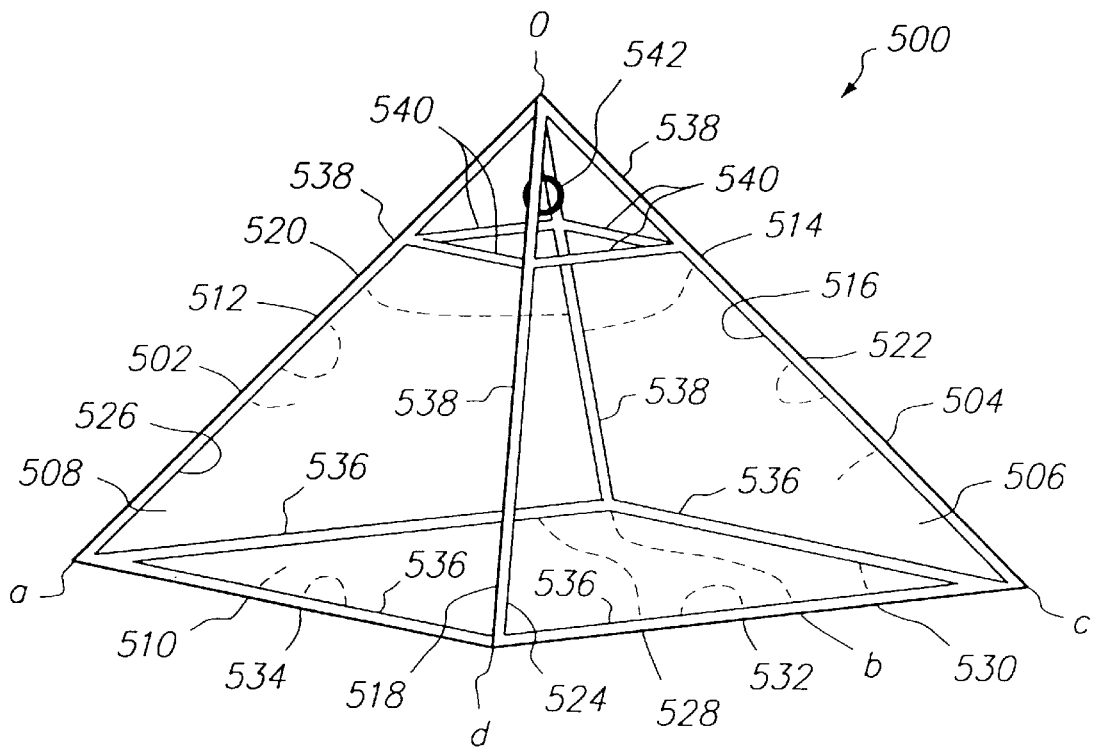
FIG. 5 is a perspective view of a four-walled architectural structure in accordance with the present invention.

FIG. 5 is a perspective view of a four-sided architectural structure 500, including a first wall 502, a second wall 504, a third wall 506, and a fourth wall 508, all resting on a floor 510. Walls 502, 504, 506 and 508 are triangular shaped, each having a first side edge 512, 514, 516, and 518, a second side edge 520, 522, 524, and 526, and a base edge 528, 530, 532, and 534, respectively. Walls 502, 504, 506, and 508 are disposed adjacent one another to form structure 500 as a pyramid, base edges 528, 530, 532, and 534 forming a support base for supporting structure 500 on floor 510. In particular,. first side edge 512 of first wall 502 is disposed adjacent second side edge 526 of fourth wall 508, second side edge 520 of first wall 502 is disposed adjacent first side edge 514 of second wall 504, second side edge 522 of second wall 504 is disposed adjacent first side edge 516 of third wall 506, and second side edge 524 of third wall 506 is disposed adjacent first side edge 518 of fourth wall 510. It is not necessary for the side edges of walls 502, 504, 506, and 508 to actually abut one another, as long as each of walls 502, 504, 506, and 508 lies in an associated plane passing through an adjacent pair of four base vertices (a, b, c, d) and an apex (O) of structure 500. For example, first wall 502 lies in an associated plane passing through base vertices (a) and (b) and apex (O). Walls 502, 504, 506 and 508 each have a reflective surface facing the interior of architectural structure 500. Similar to architectural structure 100, architectural structure 500 includes a number of ornamental structure groups including a base edge group 536, a side edge group 538, a wall stripe group 540, and a suspended ornament 542.

Figure 6:
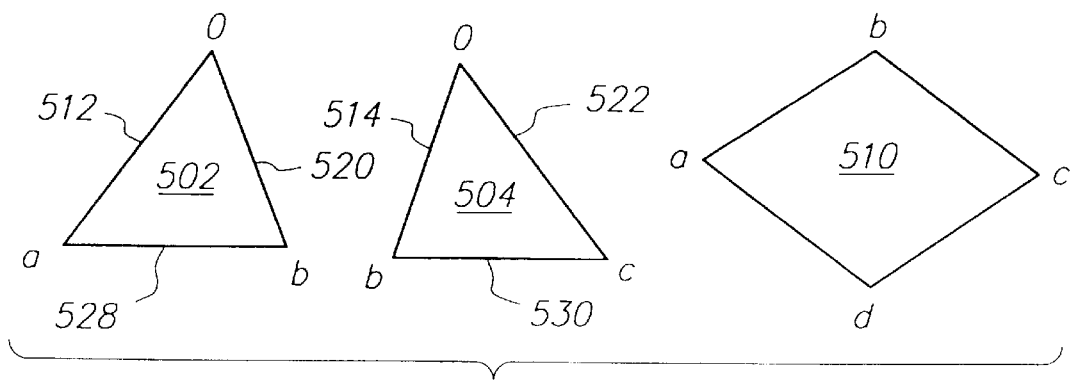
FIG. 6 is a plan view of two walls and a floor of the structure shown in FIG. 5.

FIG. 6 is a plan view of first wall 502, second wall 504 and floor 510. Third wall 506 is identical to first wall 502 and fourth wall 508 is identical to second wall 504. Therefore, third wall 506 and fourth wall 508 are not shown for the sake of clarity. In order for structure 500 to generate a coherent image of a polyhedron, certain size and angular relationships must be maintained between walls 502, 504, 506, and 508, and floor 510. In this particular embodiment, first side 502 is constructed with apex angle (aOb) of 54.73 degrees, first side edge 512 (aO) of 1 unit in length, second side edge 520 (bO) of 0.866 units in length, and base edge 528 (ab) of 0.866 units in length. Second side 504 is constructed with apex angle (bOc) of 54.73 degrees, first side edge 514 (bO) of 0.866 units in length, second side edge 522 (cO) of 1 unit in length, and base edge 530 (bc) of 0.866 units in length. Floor 510 is a rhombus, wherein each of sides (ab), (be), (cd), and (da) is 0.866 units in length, angles (abc) and (cda) are 109.45 degrees, and angles (bcd) and (dab) are 70.55 degrees. Those skilled in the art will recognize that, given the relationships provided above, architectural structure 500 may be scaled to any desirable size.

Figure 7A:
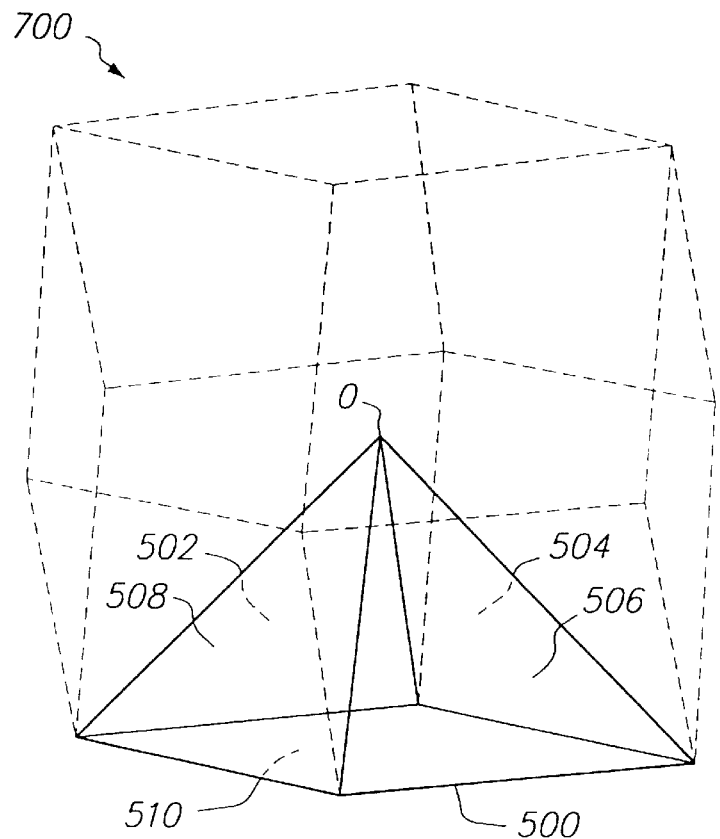
FIG. 7a is a perspective view of the virtual space generated by the structure of FIG. 5.

FIG. 7a is a perspective view of a virtual rhombic dodecahedron (12 faces) 700 (dotted lines) generated by architectural structure 500 (solid lines), as it would appear to an observer inside structure 500. Each face of virtual rhombic dodecahedron 700 is an image of floor 510 in the reflective surfaces of walls 502, 504, 506, and 508. Structure 500 constitutes one cell of virtual rhombic dodecahedron 700, with the apex (O) of structure 500 positioned at the center of virtual rhombic dodecahedron 700. The remaining cells each consist of one face of virtual rhombic dodecahedron 700 with side edges (not shown) extending from the vertices of the face to apex (O) of structure 500, at the center of virtual rhombic dodecahedron 700.

Figure 7B:
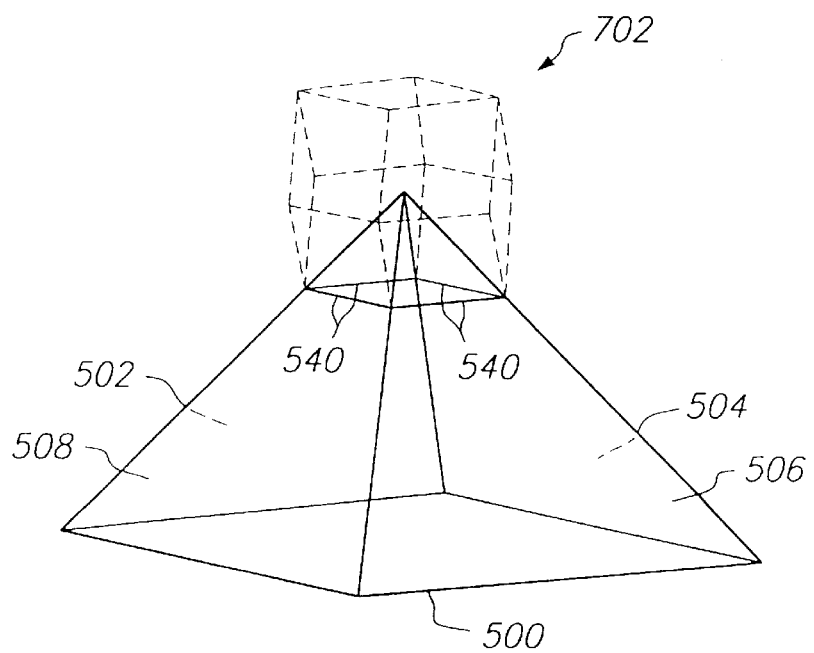
FIG. 7b is a perspective view of the virtual image generated by an ornamental structure disposed on the walls of the structure of FIG. 5.

FIG. 7b is a perspective view of a virtual rhombic dodecahedron 702 generated from wall stripe group 540 by architectural structure 500. Each edge of virtual rhombic dodecahedron 702 is an image of one or more sections of wall stripe group 540 in the reflective surfaces of walls 502, 504, 506, and 508. To an observer inside architectural structure 500, virtual rhombic dodecahedron 702 appears as a wire frame structure floating in air.

Figure 7C:
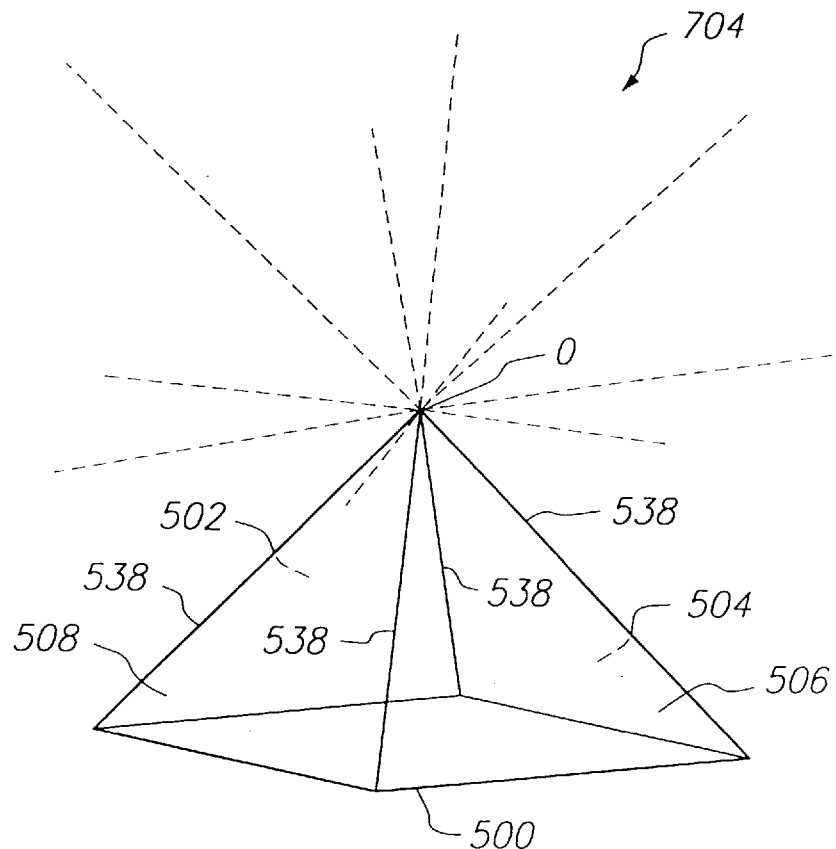
FIG. 7c is a perspective view of the virtual image generated by ornamental structures disposed along the edges of the walls of the structure of FIG. 5.

FIG. 7c is a perspective view of a plurality 704 of virtual lines generated from side edge group 538 by architectural structure 500. Each virtual line is an image of one section of side edge group 538 in the reflective surfaces of walls 502, 504, 506, and 508. To an observer inside architectural structure 500, virtual lines 704 appear to extend from apex (O) of structure 500 to the vertices of virtual rhombic dodecahedron 700 (not shown).

Figure 7D:
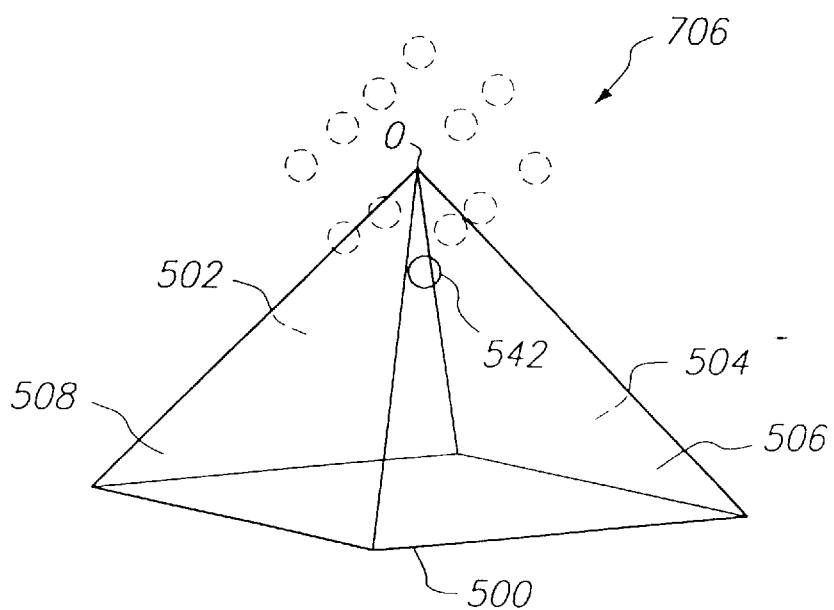
FIG. 7d is a perspective view of the virtual image generated by an ornamental structure suspended from the apex of the structure of FIG. 5.

FIG. 7d is a perspective view of a virtual eleven-element structure 706 generated from ornament 542 by structure 500. Each element of eleven-element structure 706 is an image of ornament 542 in the reflective surface of walls 502, 504, 506, and 508. To an observer inside architectural structure 500. eleven-element structure 706 and ornament 542 appear together as a twelve-element structure, with each element disposed a fixed distance from the apex (O) of structure 500, along an associated axis (not shown) passing from apex (O) to the center of one of the faces of virtual rhombic dodecahedron 700 (not shown).

FIG. 8 is a table 800 providing linear and angular measurements for constructing other four-sided architectural structures capable of generating coherent virtual polyhedra. As indicated above with respect to the three-walled structures, the structures may be modified (e.g., tilting with respect to the floor) so long as the angles between the walls at the apex are not changed, and the symmetry requirement (i.e., about plane bisectors of angles formed between walls meeting at odd ordered vertices) is satisfied.

Figure 9:
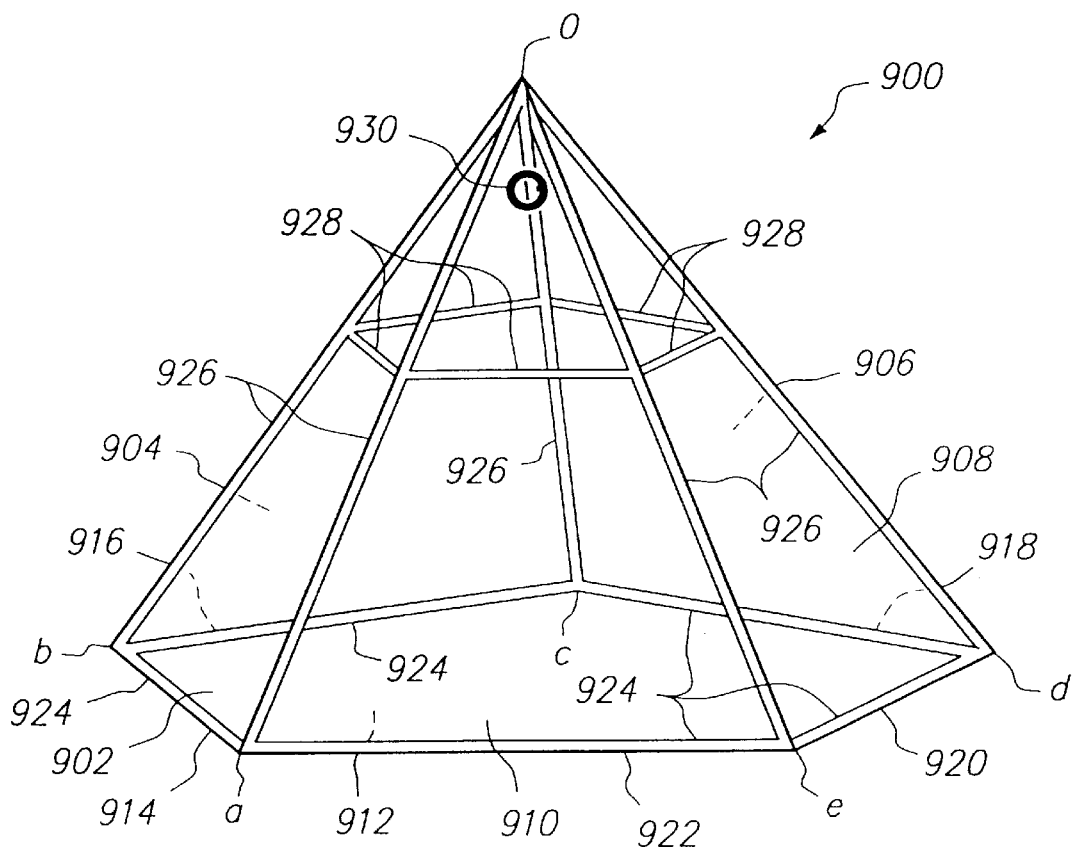
FIG. 9 is a perspective view of a five-walled architectural structure in accordance with the present invention.

FIG. 9 is a perspective view of a five-sided architectural structure 900, including a first wall 902. a second wall 904, a third wall 906, a fourth wall 908, and a fifth wall 910, all resting on a floor 912. Walls 902, 904, 906, 908, and 910 are disposed adjacent one another to form structure 900 as a pyramid. Each of walls 902, 904, 906, 908, and 910 has a base edge 914, 916, 918, 920, and 922, respectively, which, together form a pentagonal support base for supporting structure 900 on floor 912. It is not necessary for walls 902, 904, 906, 908, and 910 to actually abut one another, as long as each of walls 902, 904, 906, 908, and 910 lies in an associated plane passing through an adjacent pair of five base vertices (a, b, c, d, e) and an apex (O) of structure 100. For example, first wall 902 lies in an associated plane passing through base vertices (a) and (b) and apex (O). Walls 902, 904, 906, 908, and 910 each have a reflective surface facing the interior of architectural structure 900. Similar to architectural structure 100, architectural structure 900 includes a number of ornamental structure groups including a base edge group 924. a side edge group 926. a wall stripe group 928, and a suspended ornament 930.

Figure 10:
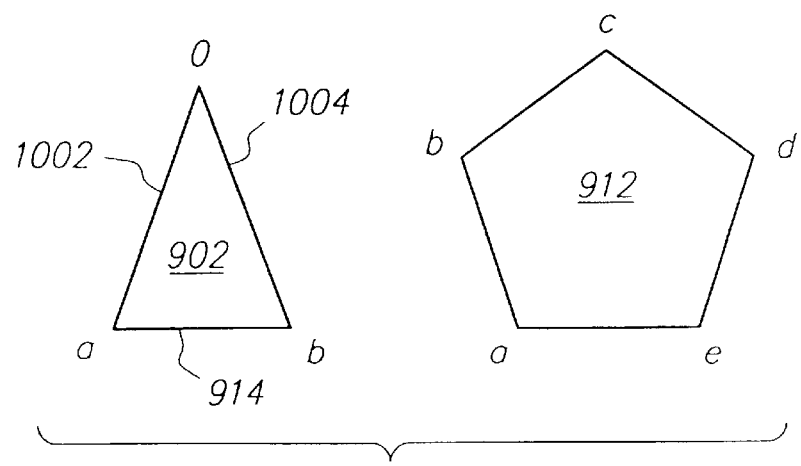
FIG. 10 is a plan view of one wall and a floor of the structure shown in FIG. 9.

FIG. 10 is a plan view of first wall 902 and floor 912. Second wall 904, third wall 906, fourth wall 908, and fifth wall 910 are identical to first wall 902, and, therefore, are not shown for the sake of clarity. In order for structure 900 to generate a coherent image of a polyhedron, certain size and angular relationships must be maintained between walls 902, 904, 906, 908, and 910, and floor 912. In this particular embodiment, apex angle (aOb) of first side 902 is 41.8 degrees, the side edges 1002 (aO) and 1004 (bO) are both 1 unit in length, and base edge 914 (ab) is 0.713 units in length. Floor 510 is a regular pentagon, wherein sides (ab), (bc), (cd), (de), and (ea) are each 0.713 units in length, and angles (abc), (bcd), (cde), (dea), and (eab) are all 108 degrees. Those skilled in the art will recognize that, given the relationships provided above, architectural structure 500 may be scaled to any desirable size.

Figure 11A:
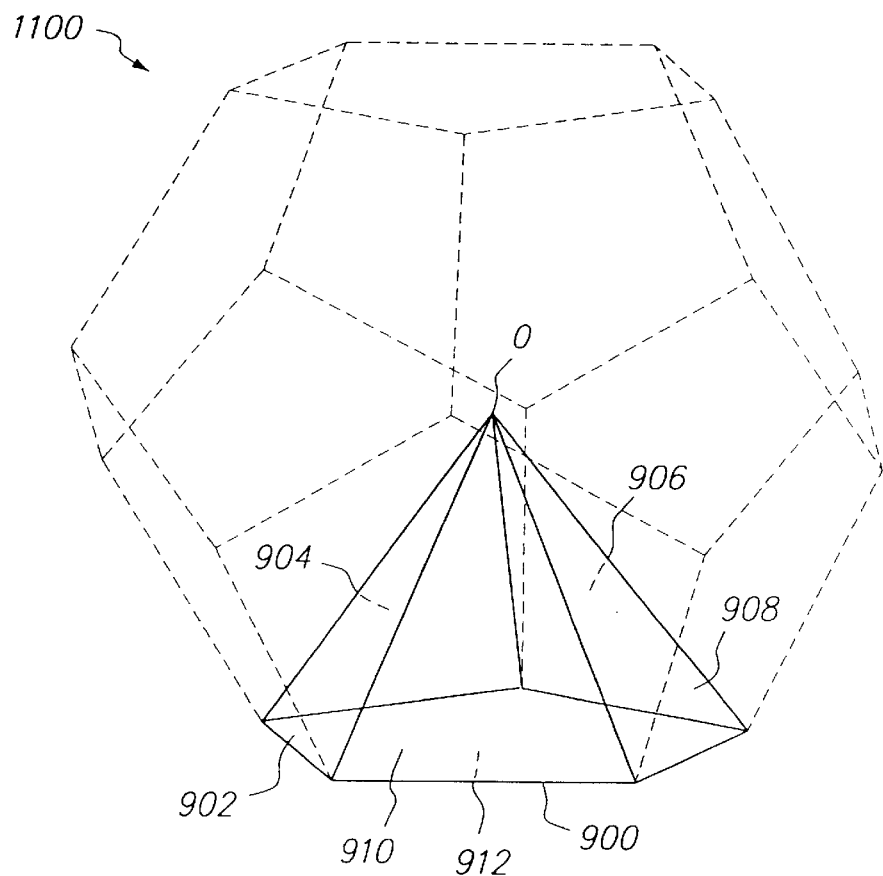
FIG. 11a is a perspective view of the virtual space generated by the structure of FIG. 9.

FIG. 11a is a perspective view of a virtual dodecahedron (12 faces) 1100 (dotted lines) generated by architectural structure 900 (solid lines), as it would appear to an observer inside structure 900. Each face of virtual dodecahedron 1100 is an image of floor 912 in the reflective surfaces of walls 902, 904, 906, 908, and 910. Structure 900 constitutes one cell of virtual dodecahedron 1100. with the apex (O) of structure 900 positioned at the center of virtual dodecahedron 1100. The remaining cells each consist of one face of virtual dodecahedron 1100 with side edges (not shown) extending from the vertices of the face 1100 to apex (O) of structure 900, at the center of virtual dodecahedron 1100.

Figure 11B:
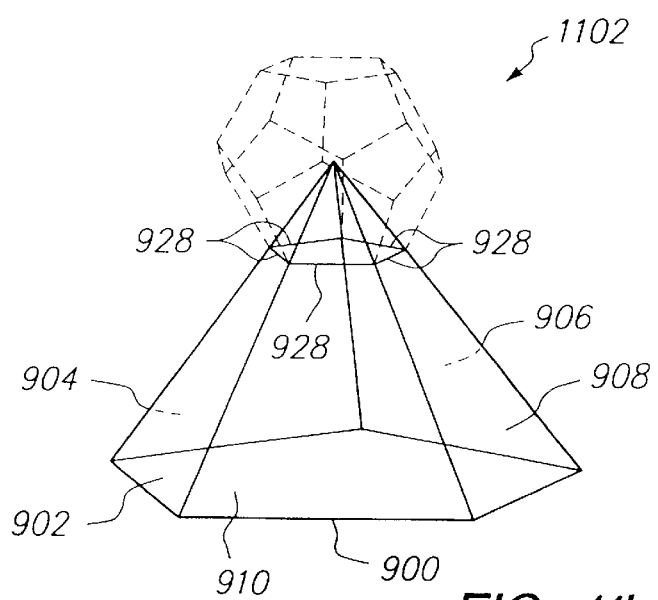
FIG. 11b is a perspective view of the virtual image generated by an ornamental structure disposed on the walls of the structure of FIG. 9.

FIG. 11b is a perspective view of a virtual dodecahedron 1102 generated from wall stripe group 928 by architectural structure 900. Each edge of virtual dodecahedron 1102 is an image of one or more sections of wall stripe group 928 in the reflective surfaces of walls 902, 904, 906, 908, and 910. To an observer inside architectural structure 900, virtual dodecahedron 1102 appears as a wire-frame structure floating in air.

Figure 11C:
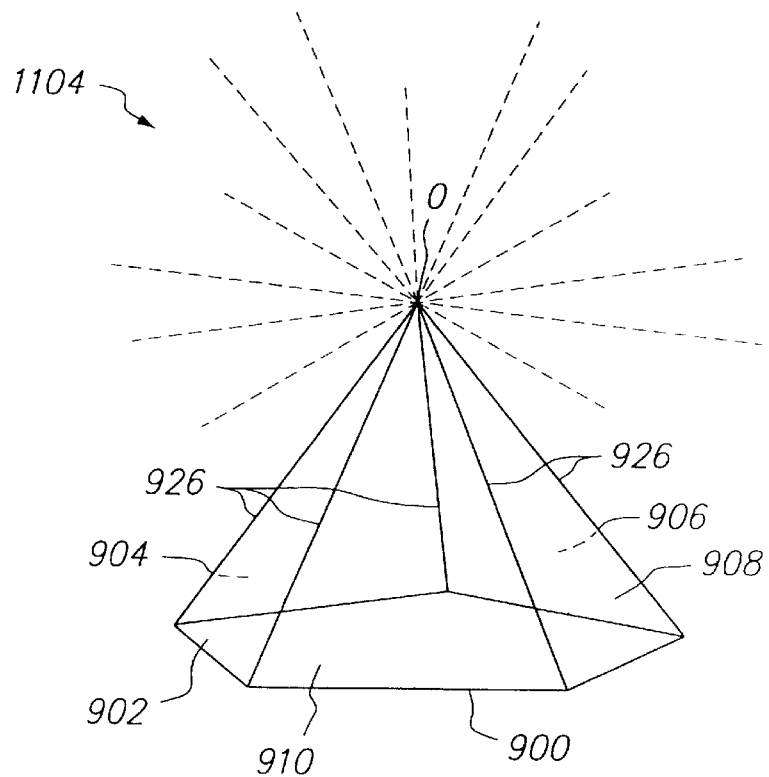
FIG. 11c is a perspective view of the virtual image generated by ornamental structures disposed along the edges of the walls of the structure of FIG. 9.

FIG. 11c is a perspective view of a plurality 1104 of virtual lines generated from side edge group 926 by architectural structure 900. Each virtual line is an image of one section of side edge group 926 in the reflective surfaces of walls 902, 904, 906, 908, and 910. To an observer inside architectural structure 900, virtual lines 1104 appear to extend from apex (O) of structure 900 to the vertices of virtual dodecahedron 1100 (not shown).

Figure 11D:
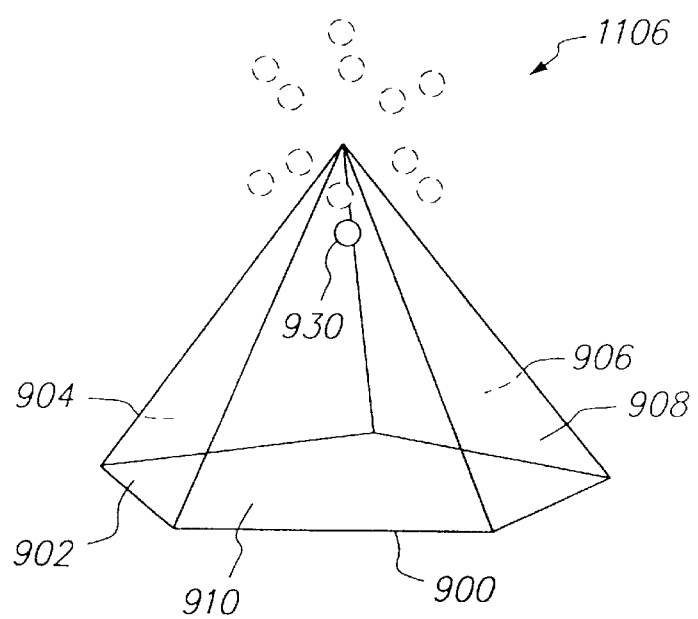
FIG. 11d is a perspective view of the virtual image generated by an ornamental structure suspended from the apex of the structure of FIG. 9.

FIG. 11d is a perspective view of a virtual eleven-element structure 1106 generated from ornament 930 by structure 900. Each element of eleven-element structure 1106 is an image of ornament 930 in the reflective surfaces of walls 902, 904, 906, 908, and 910. To an observer inside architectural structure 900, eleven-element structure 1106 and ornament 930 appear together as a twelve-element structure, with each element disposed a fixed distance from apex (O) along an associated axis (not shown) passing from apex (O) to the center of one of the faces of virtual dodecahedron 1100 (not shown).

Figure 12:
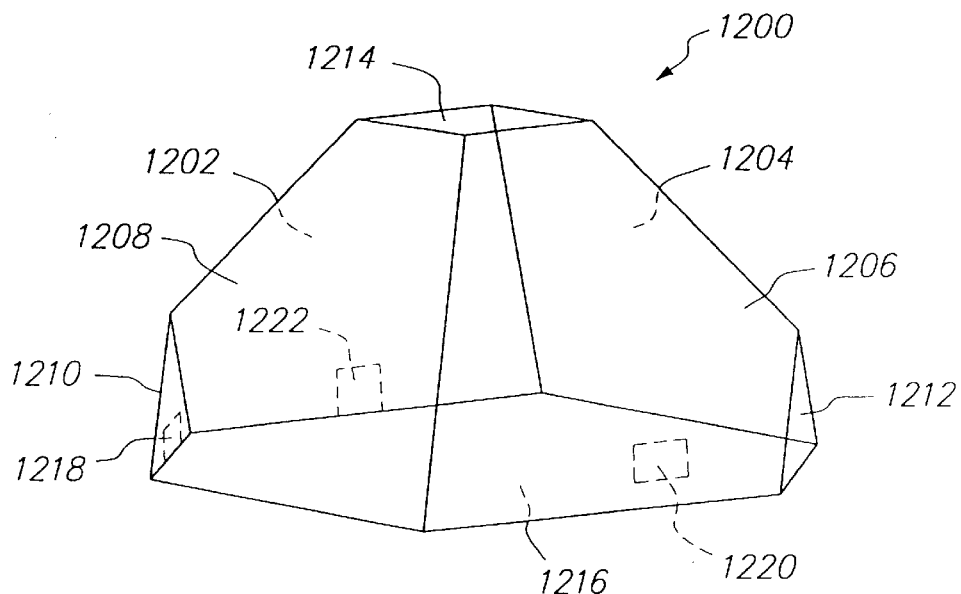
FIG. 12 is a perspective view of a truncated, four-walled architectural structure in accordance with the present invention.

FIG. 12 is a perspective view of a truncated, four-sided architectural structure 1200, including a first truncated side wall 1202, a second truncated side wall 1204, a third truncated side wall 1206. a fourth truncated side wall 1208, a first end wall 1210, a second end wall 1212, and an apex cap wall 1214. Walls 1202, 1204, 1206, 1208, 1210, 1212, and 1214 are disposed, as shown in FIG. 12 to form structure 1200 as a pyramid, with two of its opposing base corners and its apex truncated, resting on a floor 1216. Except for the truncations, structure 1200 is identical to four-sided structure 500 of FIG. 5.

Figure 13:
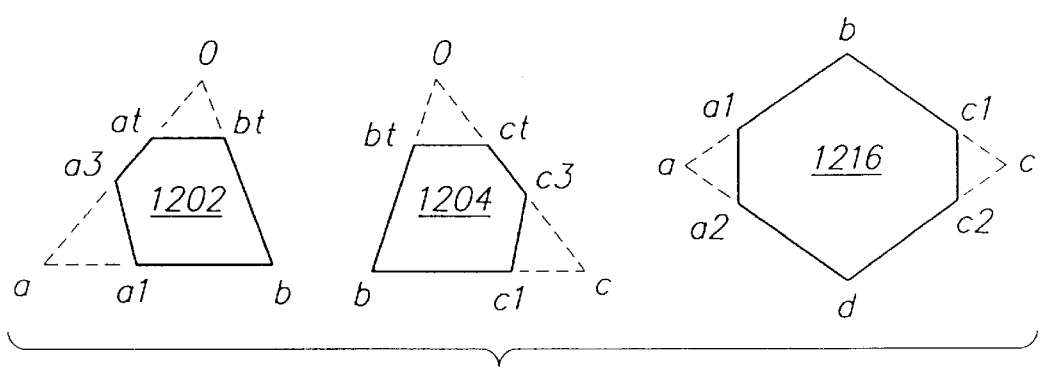
FIG. 13 is a plan view of two walls and a floor of the structure shown in FIG. 12.

FIG. 13 shows a plan view of first truncated side wall 1202, second truncated side wall 1204, and floor 1216. Third truncated side wall 1206 is identical to first truncated side wall 1202, and fourth truncated side wall 1208 is identical to second truncated side wall 1204. Therefore, third truncated side wall 1206 and fourth truncated side wall 1208 are not shown for the sake of clarity. End walls 1210 and 1212, and apex cap 1214, are shaped and sized to fit into the openings into structure 1200 created by the truncations of side walls 1202, 1204, 1206, and 1208.

First truncated side wall 1202 is identical to side wall 502 (FIG. 6), except for the truncation (at-bt) across vertex (O), and the truncation (a1-a3) across vertex (a). The angle of truncation (a1-a3) can vary. In fact, any truncation of the walls is permissible, as long as symmetry is maintained about the plane bisectors of the angles formed between walls meeting at odd ordered vertices. Because vertices (b) and (d) of structure 1200 are odd ordered (structure 1200 is a {4,3,4,3} structure), second truncated side wall 1204 must be a mirror image of first truncated side wall 1202. Floor 1216 is truncated across vertices (a) and (c) to accommodate the truncations of side walls 1202, 1204, 1206, and 1208.

End walls 1210 and 1212 provide a convenient location for doorways to provide access to the interior of structure 1200. For example, structure 1200 may be accessed through an opening 1218 in end wall 1210. Alternatively, structure 1200 may be accessed through an opening 1220 (FIG. 12) through floor 1216 or through an opening 1222 (FIG. 12) in one of side walls 1202, 1204, 1206, and 1208. In fact, any of the structures described in this disclosure may be accessed through their floors or side walls.

Figure 14A:
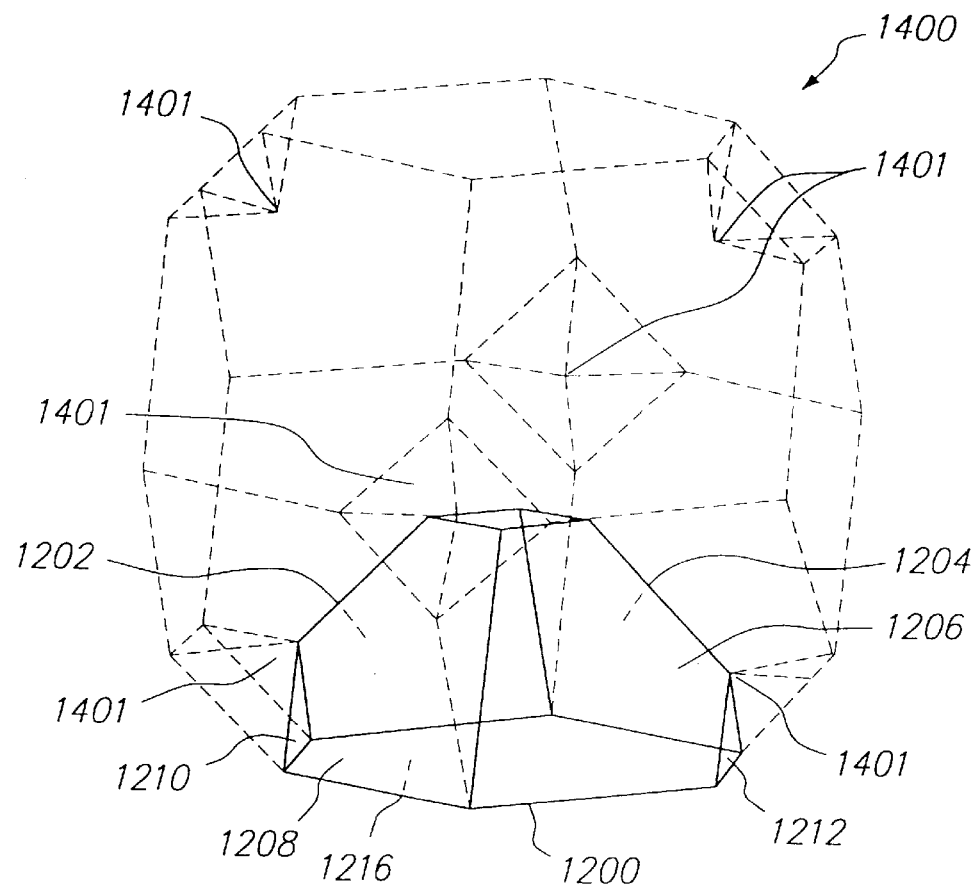
FIG. 14a is a perspective view of the virtual space generated by the truncated, four-walled architectural structure of FIG. 12.

FIG. 14a is a perspective view of a virtual polyhedron 1400 (dotted lines) generated by structure 1200 (solid lines) as it would appear to an observer inside structure 1200. Each hexagonal face of virtual polyhedron 1400 is an image of floor 1216 in the reflective surfaces of walls 1202, 1204, 1206, and 1208. Each triangular face of virtual polyhedron 1400 is an image of end wall 1210 and/or end wall 1212 in the reflective surfaces of walls 1202, 1204, 1206, and 1208. Because end walls 1210 and 1212 are oriented substantially perpendicular to floor 1216, the triangular faces of virtual polyhedron 1400 form inward projecting pyramids 1401. Tilting end walls 1210 and 1212 inward or outward causes the projection depth of pyramids 1401 to increase or decrease, respectively.

Figure 14B:
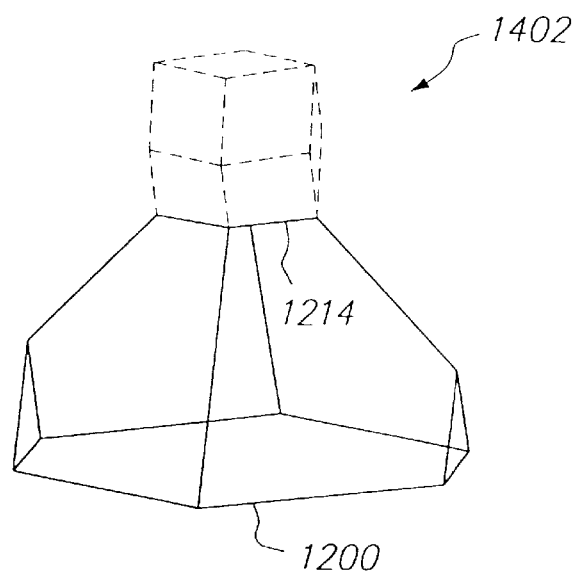
FIG. 14b is a perspective view of the virtual image generated by the truncated apex of the four-walled architectural structure of FIG. 12.

FIG. 14b is a perspective view of a virtual structure 1402 generated by structure 1200 from apex cap wall 1214. In one embodiment, apex cap wall 1214 has a non-reflective coating, and virtual structure 1402 appears, therefore, as a solid, opaque object. In an alternate embodiment, apex cap wall 1214 is a skylight or lighted panel, and virtual structure 1402 appears, therefore, as a solid, light-emitting object.

It should be apparent to those skilled in the art that any of the above described ornamental structures may be included in truncated, four-sided architectural structure 1200. For example, an ornamental element suspended from the center of apex cap wall 1214 generates an multi-element image in the reflective surfaces of walls 1202, 1204, 1206, and 1208, as described above.

Figure 15:
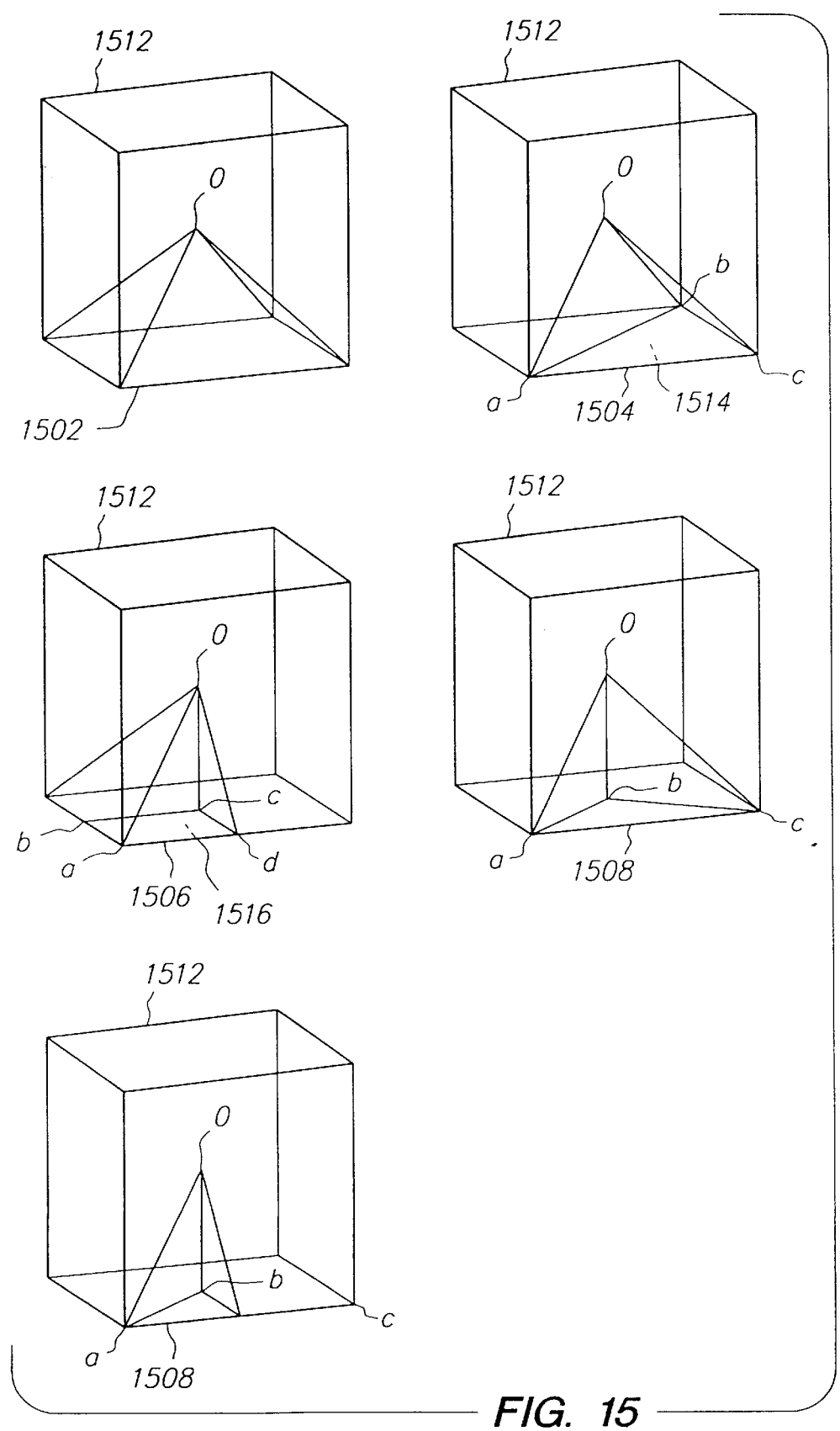
FIG. 15 is a perspective view of several architectural structures capable of generating an image of an infinite lattice of sub-divided cubes.

FIG. 15 is a perspective view of several architectural structures 1502, 1504, 1506, 1508, and 1510, which are capable of generating an image of an infinite lattice of sub-divided cubes. In general, structures 1502, 1504, 1506, 1508, and 1510 are created from selected previously described structures, by providing the floor with a reflective surface similar to the walls, and tilting the structure such that the apex coincides with the center of a virtual cube 1512, while the floor coincides with a section of one of the faces of virtual cube 1512. For example, structure 1502 corresponds to the {3,3,3,3} structure listed in table 800 of FIG. 8. No tilting is necessary for the {3,3,3,3} structure.

Structure 1504 is formed from the {6,6,3} structure listed in table 400 of FIG. 4, by tilting the {6,6,3} structure with respect to a floor 1514, until its apex (O) coincides with the center of virtual cube 1512 and its base vertices (a, b, and c) each coincide with a corner of virtual cube 1512. Similarly, structure 1506 is formed from the {4,4,3,4} structure listed in table 800 of FIG. 8, by tilting the {4,4,3,4} structure with respect to a floor 1516, until its apex coincides with the center of virtual cube 1512, its base vertex (a) coincides with a corner of virtual cube 1512, its base vertices (b and d) coincide with the mid-points of two adjacent edges of virtual cube 1512 meeting at vertex (a), and its base vertex (c) coincides with the center of the face of virtual cube 1512 adjacent base vertices (a, b, and d).

Structure 1508 is formed from either the {6,4,6} structure or the {4,4,4} structure listed in table 400 of FIG. 4. If the {6,4,6} structure is used, the {6,4,6} structure is oriented so that its apex coincides with apex (O) of structure 1508. If the {4,4,4} structure is used, the {4,4,4} structure is oriented so that its apex coincides with base vertex (b) of structure 1508. In either case, the apex (O) of structure 1508 coincides with the center of virtual cube 1512, base vertex (b) coincides with the center of a face of virtual cube 1512, and base vertices (a and c) coincide with adjacent corners of the face of virtual cube 1512 containing vertex (b).

Structure 1510 is formed from either the {8,6,4} structure or the {4,8,4} structure listed in table 400 of FIG. 4. If the {8,6,4} structure is used, the {8,6,4} structure is oriented so that its apex coincides with apex (O) of structure 1510. If the {4,8,4} structure is used, the {4,8,4} structure is oriented so that its apex coincides with base vertex (b) of structure 1510. In either case, the apex (O) of structure 1510 coincides with the center of virtual cube 1512, base vertex (b) coincides with the center of a face of virtual cube 1512, base vertex (a) coincides with a corner of the face of virtual cube 1512 containing vertex (b), and base vertex (c) coincides with the mid-point of an edge of the face of virtual cube 1512 containing vertex (b), adjacent vertex (a).

Because both the walls and floors of structures 1502, 1504, 1506, 1508, and 1510 are reflective, the entire structures may rotated without disrupting the coherent image of the lattice of sub-divided cubes. For example, structure 1504 may be rotated such that wall (aOb) is used as the floor. Additionally, the above described ornamental structure groups may be used with any of structures 1502, 1504, 1506, 1508, and 1510. For example, if the edges between the walls and the floor, and the edges between adjacent walls of structure 1502 are highlighted, structure 1502 will generate a coherent image of an octahedral lattice.

Other mirrored floor structures can be assembled by combining certain ones of the above described structures. For example, one such structure can be formed by joining a {3,3,3} structure with a {4,4,4} structure, base opening to base opening.

Figure 16:
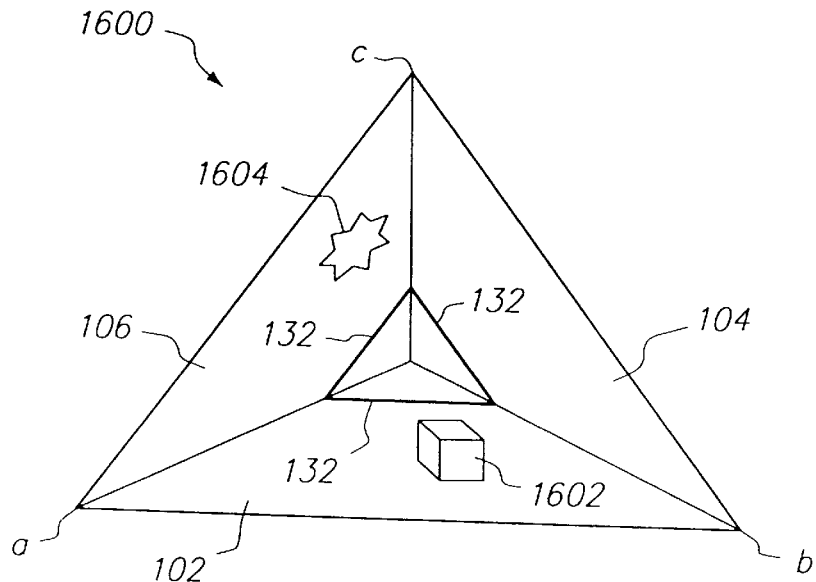
FIG. 16 is a perspective view into the open base of a scaled-down version of the structure of FIG. 1.

FIG. 16 is a perspective view of a table-top display 1600, which is a scaled down version of structure 100 of FIG. 1. tipped over onto wall 102. Display 1600 includes wall stripe group 132, as well as decorative objects 1602 and 1604. Decorative object 1602 rests directly on wall 102, and decorative object 1604 is fixed to wall 106. Wall stripe group 132 is formed from one or more light emitting devices, and generates the image of a wire frame icosahedron in the reflective walls of structure 1600, as explained above with reference to FIG. 3b. Each of structures 1602 and 1604 generate multi-element images (not shown in FIG. 16) as described above with reference to FIG. 3d. Recall that as described above, in order for the generated images to be coherent, certain symmetry relationships must be maintained with respect to the shape and placement of the objects within certain structures. In particular, symmetry must be maintained about plane bisectors of solid angles between adjacent walls meeting at odd ordered vertices (i.e., vertex index=1, 3, 5, . . . ).

The combination of coherent reflections provided by structure 1600 and the control over placement of ornamental structures within structure 1600, provide a controllable artistic medium, as opposed to the random, disjointed images generated by conventional kaleidoscopes.

Additionally, any of the structures or ornamental structure groups described in the accompanying drawings may be employed in such a manner. Furthermore, structure 1600 is not limited to table-top displays, but may be embodied in other structures, including but not limited to hand held toys.

Figure 17:
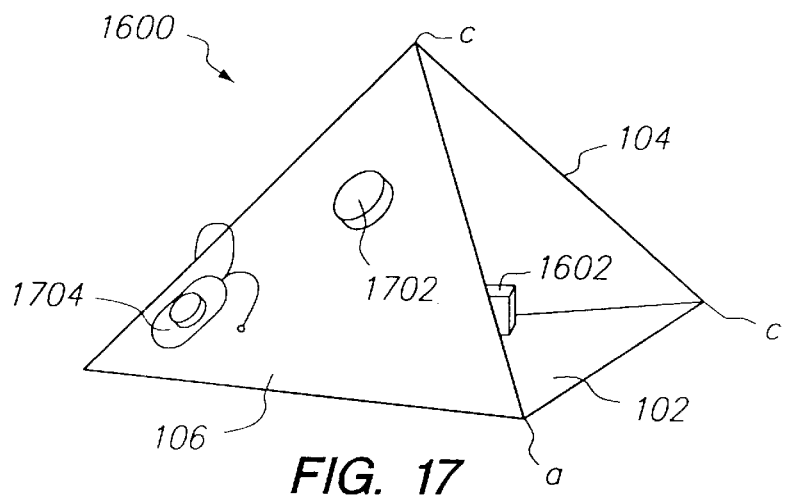
FIG. 17 is a perspective view of the exterior of the structure shown in FIG. 16.

FIG. 17 is a perspective view showing a portion of the exterior of structure 1600. In particular, structure 1600 includes a retaining element 1702 for holding decorative object 1604 in position. In a particular embodiment, retaining element 1702 is a magnet which magnetically couples to object 1604. Those skilled in the art will recognize, however, that a wide variety of retaining elements may be used to secure object 1604 in position, including but not limited to adhesives, suction cups, hooks, and mechanically attaching object 1604 to retaining element 1702, through wall 106. Magnetically coupling decorative object 1604 to retaining element 1702, however, facilitates moving and/or rotating object 1604 from the exterior of structure 1600.

Structure 1600 further includes a power/switch assembly 1704 for selectively providing power to wall stripe group 132. Assembly 1704 includes batteries for supplying electrical power, and a push-button switch that can be user operated from the exterior of structure 1600. When a user depresses the push-button, electrical power is supplied to wall stripe group 132 via a pair of wires passing through one or more of walls 102, 104, and 106.

Although assembly 1704 is shown to be of a particularly simple design, those skilled in the art will recognize that more elaborate control assemblies may be employed without departing from the spirit and scope of the present invention. For example, assembly 1704 can include a programmable controller to control a plurality of various light emitting elements disposed within structure 1600. facilitating the generation of dynamic, three-dimensional light displays.

Figure 18:
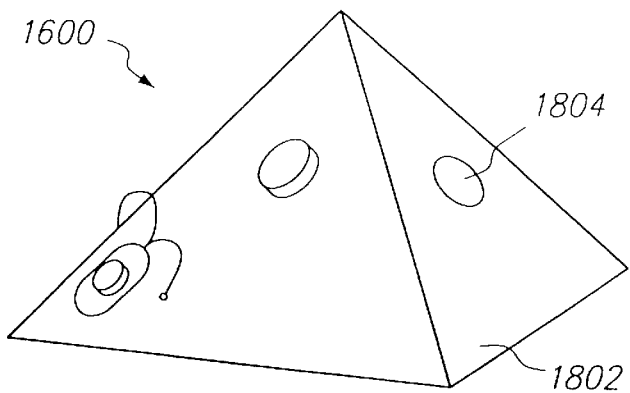
FIG. 18, as a perspective view of the structure shown in FIG. 16, with a cover over the base opening.

FIG. 18 is a perspective view of structure 1600 with a covering 1802 over the base opening. Recall that it is the image of the base covering that tiles the surface of the generated virtual polyhedron, and thus creates the image of a bounded space. A plurality of detachable base coverings may be provided to allow the user to change the appearance of the surface of the virtual polyhedron by interchanging the base coverings. An opening 1804 is provided in base covering 1802, to provide visual access to the image generated by structure 1600.

Figure 19A:
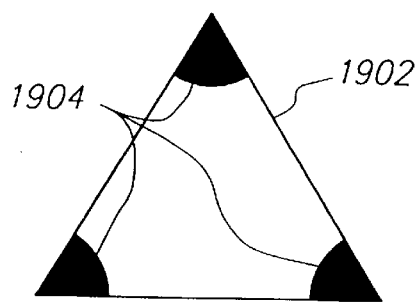
FIG. 19A is a plan view of a patterned, transparent base covering for use with the structure of FIG. 18.
Figure 19B:
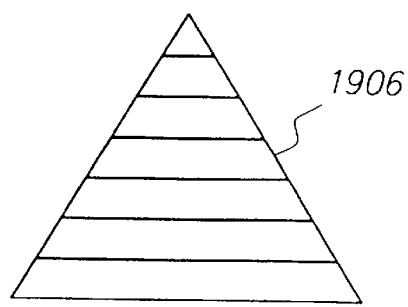
FIG. 19B is a plan view of another patterned, transparent base covering for use with the structure of FIG. 18.

Alternatively, base coverings can be formed from a transparent material (e.g., clear plastic) and can include decorative patterns. For example, FIG. 19A and FIG. 19B show base covering patterns 1902 and 1906, respectively, that can be used to generate particularly interesting images in structure 1600. Base covering 1902 includes shaded circular sectors 1904 in each of its corners, and generates the image of a transparent polyhedron with spheres disposed at each of its vertices. Base covering 1906 includes a plurality of stripes, and generates the image of a polyhedral cage of bars. Because virtually any pattern may be used on the base covering, completely transparent base coverings may be provided, upon which a user can draw any desirable pattern.

Figure 20:
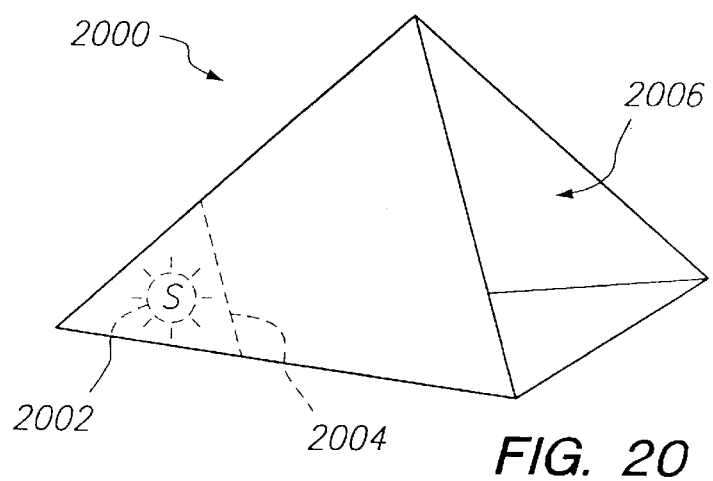
FIG. 20 is a perspective view of a table lamp made from a scaled-down version of the structure of FIG. 1.

FIG. 20 is a perspective view of a table lamp 2000 constructed from a scaled down version of structure 100, tipped on its side. Table lamp 2000 includes a light source 2002 disposed within the apex angle of structure 2000, and an optional diffuser screen 2004. Light source 2002 emits light which passes through diffuser screen 2004 and is emitted from the base opening 2006 of lamp 2000.

In an alternate embodiment, lamp 2000 is truncated across its apex, and light source 2002 is disposed outside of the truncated structure to emit light through the opening created by the truncation. Optionally, the truncation opening is covered with a diffuser similar to diffuser 2004.

When viewed through base opening 2006 the image generated by table lamp 2000 is similar, but not identical to, virtual structure 1402 described with reference to FIG. 14b. Because structure 1200 is a four-sided structure and lamp 2000 is a three-sided structure, the virtual objects generated by their truncated apexes will differ slightly, as those skilled in the art will understand.

Figure 21:
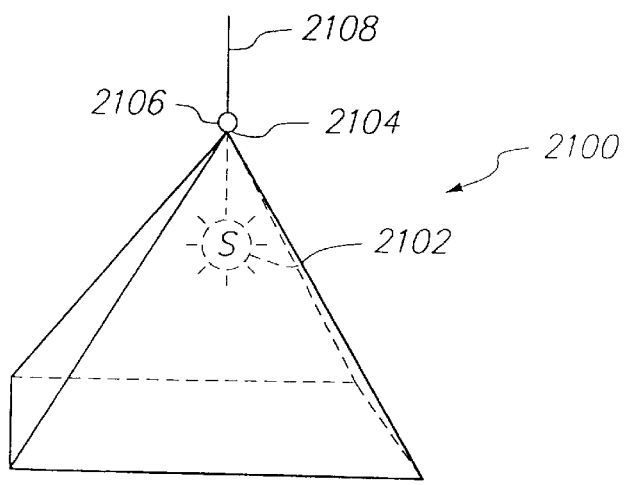
FIG. 21 is a perspective view of a hanging lamp made from a scaled-down version of the structure of FIG. 1.

Those skilled in the art will further understand that any of the above-described structures (e.g., three-sided, four-sided, or five-sided) may be incorporated into any of the scaled-down models (e.g., hand-held displays, table-top displays, or lamps) discussed herein. For example, FIG. 21 is a perspective view of a hanging lamp 2100 constructed from a four-sided structure similar to structure 500 of FIG. 5. Lamp 2100 includes a light source 2102 suspended from apex 2104 of lamp 2100. Lamp 2100 further includes a support ring 2106, fixed to the exterior of apex 2104, and a support cable 2108 fixed to support ring 2106 for suspending lamp 2100 from another structure (not shown). When viewed from below, through the open base of lamp 2100, light source 2102 generates a virtual array similar to array 706 of FIG. 7d, as those skilled in the art will readily understand.

The description of particular embodiments of the present invention is now complete. Many of the described features may be substituted, altered or omitted without departing from the scope of the invention. For example, the described structures may be large enough to be used as a commercial architectural space, or small enough to be used as a child's play house. Additionally, the described structures may be provided with instructions explaining the image generating reflections and geometries, and directing placement of objects within the structures, for use as an educational aid. As another example, the described structures may be placed atop a uniform base wall, as opposed to being supported directly by a floor. In yet another example, the described structures may be inverted (apex down) to form the bottom of a pool, creating the image of a much deeper pool. These and other alternative embodiments of the invention will be apparent to those skilled in the art, particularly in view of the foregoing disclosure.

I claim:

1. A structure comprising:
    a plurality of walls, each having a first side edge, a second side edge, and a reflective surface, said plurality of walls including at least three walls; and wherein,
    said plurality of walls are disposed adjacent one another, said first side edge of each wall adjacent said second side edge of an adjacent one of said walls, defining an interior space of said structure, said reflective surfaces facing said interior space; and wherein,
    each of said walls lies in an associated one of a plurality of planes, said plurality of associated planes intersecting at a common apex, with at least two of said planes forming a non-perpendicular angle therebetween; and wherein,
    said walls have a particular shape and are disposed relative to one another so as to generate an image of a coherent polyhedral space in said reflective surfaces.

2. A structure according to claim 1, wherein each of the reflective walls further comprises a base edge, said base edges defining a base opening for providing access to said interior space.

3. A structure according to claim 2, further comprising a decorative object disposed within said interior space.

4. A structure according to claim 3, wherein said decorative object is fixed to one of said reflective surfaces.

5. A structure according to claim 4, further comprising a magnetic retainer for fixing said decorative object to one of said walls.

6. A structure according to claim 3, wherein said decorative object rests upon one of said walls.

7. A structure according to claim 3, further comprising an ornamental structure group disposed within said interior space.

8. A structure according to claim 7, wherein said ornamental structure group includes at least one light emitting device.

9. A structure according to claim 8, wherein said at least one light emitting device comprises a plurality of light emitting devices, and further comprising a control unit for selectively energizing particular groups of said light emitting devices.

10. A structure according to claim 9, wherein said control unit is programmable to energize particular groups of said light emitting devices, said energized groups of light emitting devices forming images of coherent structures in said reflective surfaces.

11. A structure according to claim 2, further comprising a base covering for covering at least a portion of said base opening.

12. A structure according to claim 11, wherein said base covering defines an aperture for providing visual access to said interior space.

13. A structure according to claim 11, wherein at least a portion of said base covering is formed of a transparent material.

14. An structure according to claim 13, wherein said base covering includes a design patterned on said transparent portion of said base covering.

15. A structure according to claim 11, wherein said base covering is detachable.

16. A structure according to claim 2, further comprising instructions describing the generation of virtual images by said structure.

17. A structure according to claim 16, further comprising a decorative object disposed within said interior space, and wherein said instructions describe particular placements of said decorative object and the generated image resulting therefrom.

18. A structure according to claim 16, further comprising a base covering for covering at least a portion of said base opening, and wherein said instructions describe the generation of a coherent virtual polyhedron from said base covering by said structure.

19. A structure according to claim 1, further comprising a light source, whereby said structure is operational as a lamp.

20. A structure according to claim 19, wherein:
    said structure is truncated across its apex; and
    said light source is disposed outside of said structure to emit light through said truncation.

21. A structure according to claim 19, wherein said light source is disposed within the interior space of said structure.

22. A structure according to claim 19, further comprising a diffuser disposed within said structure to divide said interior space into an apex portion and a base portion, and wherein said light source is disposed within said apex portion.

23. A structure according to claim 1, wherein:
    said first side edge and said second side edge of a first one of the plurality of reflective walls form an angle of about 109 degrees;
    said first side edge and said second side edge of a second one of the plurality of reflective walls form an angle of about 109 degrees; and
    said first side edge and said second side edge of a third one of the plurality of reflective walls form an angle of about 109 degrees.

24. A structure according to claim 23, wherein:
    said first one of the plurality of reflective walls and said second one of the plurality of reflective walls form a solid angle of about 120 degrees;
    said second one of the plurality of reflective walls and said third one of the plurality of reflective walls form a solid angle of about 120 degrees; and
    said third one of the plurality of reflective walls and said first one of the plurality of reflective walls form a solid angle of about 120 degrees.

25. A structure according to claim 1, wherein:
    said first side edge and said second side edge of a first one of the plurality of reflective walls form an angle of about 109 degrees;

said first side edge and said second side edge of a second one of the plurality of reflective walls form an angle of about 71 degrees; and said first side edge and said second side edge of a third one of the plurality of reflective walls form an angle of about 71 degrees.

26. A structure according to claim 25, wherein:

said first one of the plurality of reflective walls and said second one of the plurality of reflective walls form a solid angle of about 60 degrees;

said second one of the plurality of reflective walls and said third one of the plurality of reflective walls form a solid angle of about 120 degrees; and said third one of the plurality of reflective walls and said first one of the plurality of reflective walls form a solid angle of about 60 degrees.

27. A structure according to claim 1, wherein:

said first side edge and said second side edge of a first one of the plurality of reflective walls form an angle of about 55 degrees;

said first side edge and said second side edge of a second one of the plurality of reflective walls form an angle of about 55 degrees; and said first side edge and said second side edge of a third one of the plurality of reflective walls form an angle of about 71 degrees.

28. A structure according to claim 27, wherein:

said first one of the plurality of reflective walls and said second one of the plurality of reflective walls form a solid angle of about 90 degrees;

said second one of the plurality of reflective walls and said third one of the plurality of reflective walls form a solid angle of about 60 degrees; and said third one of the plurality of reflective walls and said first one of the plurality of reflective walls form a solid angle of about 60 degrees.

29. A structure according to claim 1, wherein:

said first side edge and said second side edge of a first one of the plurality of reflective walls form an angle of about 90 degrees;

said first side edge and said second side edge of a second one of the plurality of reflective walls form an angle of about 90 degrees; and said first side edge and said second side edge of a third one of the plurality of reflective walls form an angle of about 45 degrees.

30. A structure according to claim 29, wherein:

said first one of the plurality of reflective walls and said second one of the plurality of reflective walls form a solid angle of about 45 degrees;

said second one of the plurality of reflective walls and said third one of the plurality of reflective walls form a solid angle of about 90 degrees; and said third one of the plurality of reflective walls and said first one of the plurality of reflective walls form a solid angle of about 90 degrees.

31. A structure according to claim 1, wherein:

said first side edge and said second side edge of a first one of the plurality of reflective walls form an angle of about 55 degrees;

said first side edge and said second side edge of a second one of the plurality of reflective walls form an angle of about 35 degrees; and said first side edge and said second side edge of a third one of the plurality of reflective walls form an angle of about 45 degrees.

32. A structure according to claim 31, wherein:

said first one of the plurality of reflective walls and said second one of the plurality of reflective walls form a solid angle of about 60 degrees;

said second one of the plurality of reflective walls and said third one of the plurality of reflective walls form a solid angle of about 90 degrees; and said third one of the plurality of reflective walls and said first one of the plurality of reflective walls form a solid angle of about 45 degrees.

33. A structure according to claim 1, wherein:

said first side edge and said second side edge of a first one of the plurality of reflective walls form an angle of about 55 degrees;

said first side edge and said second side edge of a second one of the plurality of reflective walls form an angle of about 55 degrees; and said first side edge and said second side edge of a third one of the plurality of reflective walls form an angle of about 90 degrees.

34. A structure according to claim 33, wherein:

said first one of the plurality of reflective walls and said second one of the plurality of reflective walls form a solid angle of about 120 degrees;

said second one of the plurality of reflective walls and said third one of the plurality of reflective walls form a solid angle of about 45 degrees; and said third one of the plurality of reflective walls and said first one of the plurality of reflective walls form a solid angle of about 45 degrees.

35. A structure according to claim 1, wherein:

said first side edge and said second side edge of a first one of the plurality of reflective walls form an angle of about 37 degrees;

said first side edge and said second side edge of a second one of the plurality of reflective walls form an angle of about 32 degrees; and said first side edge and said second side edge of a third one of the plurality of reflective walls form an angle of about 21 degrees.

36. A structure according to claim 35, wherein:

said first one of the plurality of reflective walls and said second one of the plurality of reflective walls form a solid angle of about 36 degrees;

said second one of the plurality of reflective walls and said third one of the plurality of reflective walls form a solid angle of about 90 degrees; and said third one of the plurality of reflective walls and said first one of the plurality of reflective walls form a solid angle of about 60 degrees.

37. A structure according to claim 1, wherein:

said first side edge and said second side edge of a first one of the plurality of reflective walls form an angle of about 37 degrees;

said first side edge and said second side edge of a second one of the plurality of reflective walls form an angle of about 37 degrees; and said first side edge and said second side edge of a third one of the plurality of reflective walls form an angle of about 42 degrees.

38. A structure according to claim 37, wherein:

said first one of the plurality of reflective walls and said second one of the plurality of reflective walls form a solid angle of about 72 degrees;

said second one of the plurality of reflective walls and said third one of the plurality of reflective walls form a solid angle of about 60 degrees; and said third one of the plurality of reflective walls and said first one of the plurality of reflective walls form a solid angle of about 60 degrees.

39. A structure according to claim 1, wherein:

said first side edge and said second side edge of a first one of the plurality of reflective walls form an angle of about 63 degrees;

said first side edge and said second side edge of a second one of the plurality of reflective walls form an angle of about 63 degrees; and said first side edge and said second side edge of a third one of the plurality of reflective walls form an angle of about 63 degrees.

40. A structure according to claim 39, wherein:

said first one of the plurality of reflective walls and said second one of the plurality of reflective walls form a solid angle of about 72 degrees;

said second one of the plurality of reflective walls and said third one of the plurality of reflective walls form a solid angle of about 72 degrees; and said third one of the plurality of reflective walls and said first one of the plurality of reflective walls form a solid angle of about 72 degrees.

41. A structure according to claim 1, wherein:

said first side edge and said second side edge of a first one of the plurality of reflective walls form an angle of about 37 degrees;

said first side edge and said second side edge of a second one of the plurality of reflective walls form an angle of about 37 degrees; and said first side edge and said second side edge of a third one of the plurality of reflective walls form an angle of about 63 degrees.

42. A structure according to claim 41, wherein:

said first one of the plurality of reflective walls and said second one of the plurality of reflective walls form a solid angle of about 120 degrees;

said second one of the plurality of reflective walls and said third one of the plurality of reflective walls form a solid angle of about 36 degrees; and said third one of the plurality of reflective walls and said first one of the plurality of reflective walls form a solid angle of about 36 degrees.

43. A structure according to claim 1, wherein:

said first side edge and said second side edge of a first one of the plurality of reflective walls form an angle of about 55 degrees;

said first side edge and said second side edge of a second one of the plurality of reflective walls form an angle of about 55 degrees;

said first side edge and said second side edge of a third one of the plurality of reflective walls form an angle of about 55 degrees; and said first side edge and said second side edge of a fourth one of the plurality of reflective walls form an angle of about 55 degrees.

44. A structure according to claim 43, wherein:

said first one of the plurality of reflective walls and said second one of the plurality of reflective walls form a solid angle of about 120 degrees;

said second one of the plurality of reflective walls and said third one of the plurality of reflective walls form a solid angle of about 90 degrees;

said third one of the plurality of reflective walls and said fourth one of the plurality of reflective walls form a solid angle of about 120 degrees; and said fourth one of the plurality of reflective walls and said first one of the plurality of reflective walls form a solid angle of about 90 degrees.

45. A structure according to claim 1, wherein:

said first side edge and said second side edge of a first one of the plurality of reflective walls form an angle of about 71 degrees;

said first side edge and said second side edge of a second one of the plurality of reflective walls form an angle of about 71 degrees;

said first side edge and said second side edge of a third one of the plurality of reflective walls form an angle of about 71 degrees; and said first side edge and said second side edge of a fourth one of the plurality of reflective walls form an angle of about 71 degrees.

46. A structure according to claim 45, wherein:

said first one of the plurality of reflective walls and said second one of the plurality of reflective walls form a solid angle of about 120 degrees;

said second one of the plurality of reflective walls and said third one of the plurality of reflective walls form a solid angle of about 120 degrees;

said third one of the plurality of reflective walls and said fourth one of the plurality of reflective walls form a solid angle of about 120 degrees; and said fourth one of the plurality of reflective walls and said first one of the plurality of reflective walls form a solid angle of about 120 degrees.

47. A structure according to claim 1, wherein:

said first side edge and said second side edge of a first one of the plurality of reflective walls form an angle of about 45 degrees;

said first side edge and said second side edge of a second one of the plurality of reflective walls form an angle of about 35 degrees;

said first side edge and said second side edge of a third one of the plurality of reflective walls form an angle of about 35 degrees; and said first side edge and said second side edge of a fourth one of the plurality of reflective walls form an angle of about 45 degrees.

48. A structure according to claim 47, wherein:

said first one of the plurality of reflective walls and said second one of the plurality of reflective walls form a solid angle of about 90 degrees;

said second one of the plurality of reflective walls and said third one of the plurality of reflective walls form a solid angle of about 120 degrees;

said third one of the plurality of reflective walls and said fourth one of the plurality of reflective walls form a solid angle of about 90 degrees; and said fourth one of the plurality of reflective walls and said first one of the plurality of reflective walls form a solid angle of about 90 degrees.

49. A structure according to claim 1, wherein:

said first side edge and said second side edge of a first one of the plurality of reflective walls form an angle of about 21 degrees;

said first side edge and said second side edge of a second one of the plurality of reflective walls form an angle of about 32 degrees;

said first side edge and said second side edge of a third one of the plurality of reflective walls form an angle of about 32 degrees; and said first side edge and said second side edge of a fourth one of the plurality of reflective walls form an angle of about 21 degrees.

50. A structure according to claim 49, wherein:

said first one of the plurality of reflective walls and said second one of the plurality of reflective walls form a solid angle of about 90 degrees;

said second one of the plurality of reflective walls and said third one of the plurality of reflective walls form a solid angle of about 72 degrees;

said third one of the plurality of reflective walls and said fourth one of the plurality of reflective walls form a solid angle of about 90 degrees; and said fourth one of the plurality of reflective walls and said first one of the plurality of reflective walls form a solid angle of about 120 degrees.

51. A structure according to claim 1, wherein:

said first side edge and said second side edge of a first one of the plurality of reflective walls form an angle of about 37 degrees;

said first side edge and said second side edge of a second one of the plurality of reflective walls form an angle of about 37 degrees;

said first side edge and said second side edge of a third one of the plurality of reflective walls form an angle of about 37 degrees; and said first side edge and said second side edge of a fourth one of the plurality of reflective walls form an angle of about 37 degrees.

52. A structure according to claim 51, wherein:

said first one of the plurality of reflective walls and said second one of the plurality of reflective walls form a solid angle of about 120 degrees;

said second one of the plurality of reflective walls and said third one of the plurality of reflective walls form a solid angle of about 72 degrees;

said third one of the plurality of reflective walls and said fourth one of the plurality of reflective walls form a solid angle of about 120 degrees; and said fourth one of the plurality of reflective walls and said first one of the plurality of reflective walls form a solid angle of about 72 degrees.

53. A structure according to claim 1, wherein:

said first side edge and said second side edge of a first one of the plurality of reflective walls form an angle of about 42 degrees;

said first side edge and said second side edge of a second one of the plurality of reflective walls form an angle of about 42 degrees;

said first side edge and said second side edge of a third one of the plurality of reflective walls form an angle of about 42 degrees;

said first side edge and said second side edge of a fourth one of the plurality of reflective walls form an angle of about 42 degrees; and said first side edge and said second side edge of a fifth one of the plurality of reflective walls form an angle of about 42 degrees.

54. A structure according to claim 53, wherein:

said first one of the plurality of reflective walls and said second one of the plurality of reflective walls form a solid angle of about 120 degrees;

said second one of the plurality of reflective walls and said third one of the plurality of reflective walls form a solid angle of about 120 degrees;

said third one of the plurality of reflective walls and said fourth one of the plurality of reflective walls form a solid angle of about 120 degrees;

said fourth one of the plurality of reflective walls and said fifth one of the plurality of reflective walls form a solid angle of about 120 degrees; and said fifth one of the plurality of reflective walls and said first one of the plurality of reflective walls form a solid angle of about 120 degrees.

* * * * *